(12) United States Patent
Hayashi et al.

(10) Patent No.: US 9,619,101 B2
(45) Date of Patent: Apr. 11, 2017

(54) DATA PROCESSING SYSTEM RELATED TO BROWSING

(71) Applicant: FUJI XEROX CO., LTD., Tokyo (JP)

(72) Inventors: Eisaku Hayashi, Kanagawa (JP); Akira Tateishi, Kanagawa (JP); Kazuhiro Hayashi, Kanagawa (JP); Shinobu Ozeki, Kanagawa (JP); Masaru Kijima, Kanagawa (JP); Motoki Taniguchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 174 days.

(21) Appl. No.: 13/974,644

(22) Filed: Aug. 23, 2013

(65) Prior Publication Data

US 2014/0237423 A1 Aug. 21, 2014

(30) Foreign Application Priority Data

Feb. 20, 2013 (JP) .................................. 2013-031322

(51) Int. Cl.
*G06F 3/0481* (2013.01)
*G06F 3/0488* (2013.01)
*G06F 3/0484* (2013.01)

(52) U.S. Cl.
CPC ........ *G06F 3/0481* (2013.01); *G06F 3/04842* (2013.01); *G06F 3/04886* (2013.01)

(58) Field of Classification Search
CPC .... G06F 3/0481; G06F 9/4443; G06F 3/0482; G06F 17/241; G09G 5/14
See application file for complete search history.

(56) References Cited

U.S. PATENT DOCUMENTS 6,323,884 B1* 11/2001 Bird et al. .................... 715/810
6,362,842 B1* 3/2002 Tahara et al. ................ 715/856
6,643,824 B1* 11/2003 Bates et al. .................. 715/205
(Continued)

FOREIGN PATENT DOCUMENTS

JP 2001-265481 A 9/2001
JP B2-4347649 10/2009
(Continued)

OTHER PUBLICATIONS

Jan. 12, 2016 Office Action issued in Japanese Application No. 2013-031322.

*Primary Examiner* — Maryam Ipakchi
(74) *Attorney, Agent, or Firm* — Oliff PLC

(57) ABSTRACT

A data processing apparatus includes a display control unit that controls browsing document data to be displayed, the browsing document data being configured by plural browsing object data items, a position information acquisition unit that acquires position information, the position information being pointed by a pointing unit and indicating a position corresponding to the browsing document data displayed by the display control unit, a direction identification unit that identifies a direction pointed by the pointing unit, starting from the pointed position, based on a history of a motion by the pointing unit, and an attention data identification unit that identifies attention data indicating browsing object data that is focused, among the plural browsing object data items, based on the position information acquired by the position information acquisition unit and a direction identified by the direction identification unit.

17 Claims, 20 Drawing Sheets

(56) References Cited

U.S. PATENT DOCUMENTS

| | | | |
|---|---|---|---|
| 7,240,299 B2* | 7/2007 | Abrams | 715/857 |
| 8,438,473 B2* | 5/2013 | Mak et al. | 715/234 |
| 8,665,238 B1* | 3/2014 | Gossweiler, III | G06F 3/0488 345/173 |
| 9,047,011 B2* | 6/2015 | Lee | G06F 3/04886 |
| 9,146,636 B2* | 9/2015 | Morinaga | G06F 3/0414 |
| 2001/0024195 A1 | 9/2001 | Hayakawa | |
| 2002/0075315 A1* | 6/2002 | Scott | 345/802 |
| 2007/0067744 A1* | 3/2007 | Lane et al. | 715/860 |
| 2007/0216658 A1* | 9/2007 | Rainisto | G06F 3/04886 345/173 |
| 2008/0259041 A1* | 10/2008 | Blumenberg et al. | 345/173 |
| 2009/0064047 A1* | 3/2009 | Shim | G06F 3/04883 715/835 |
| 2010/0066694 A1* | 3/2010 | Jonsdottir | 345/173 |
| 2010/0073311 A1* | 3/2010 | Yeh | G06F 1/1626 345/173 |
| 2010/0169766 A1* | 7/2010 | Duarte | G06F 3/04883 715/244 |
| 2010/0299623 A1* | 11/2010 | Celik et al. | 715/767 |
| 2011/0057907 A1* | 3/2011 | Kim | G06F 3/042 345/175 |
| 2011/0083089 A1* | 4/2011 | Pahud | G06F 3/0425 715/765 |
| 2011/0138324 A1* | 6/2011 | Sweeney et al. | 715/800 |
| 2011/0161888 A1* | 6/2011 | Ito | G06F 3/04883 715/856 |
| 2012/0017182 A1* | 1/2012 | Bau | 715/859 |
| 2012/0169646 A1* | 7/2012 | Berkes | G06F 3/0416 345/173 |
| 2012/0182237 A1* | 7/2012 | Yun | 345/173 |
| 2013/0047100 A1* | 2/2013 | Kroeger | G06F 3/0488 715/760 |
| 2013/0097550 A1* | 4/2013 | Grossman et al. | 715/779 |
| 2013/0125066 A1* | 5/2013 | Klein et al. | 715/862 |
| 2013/0145320 A1* | 6/2013 | Oosterholt et al. | 715/823 |
| 2014/0198055 A1* | 7/2014 | Barkway | 345/173 |
| 2014/0304655 A1* | 10/2014 | Imoto | G06F 3/04842 715/823 |

FOREIGN PATENT DOCUMENTS

| | | |
|---|---|---|
| JP | A-2010-282311 | 12/2010 |
| JP | B2-4881457 | 2/2012 |
| JP | 2012-216127 A | 11/2012 |
| WO | 2011/007746 A1 | 1/2011 |

* cited by examiner

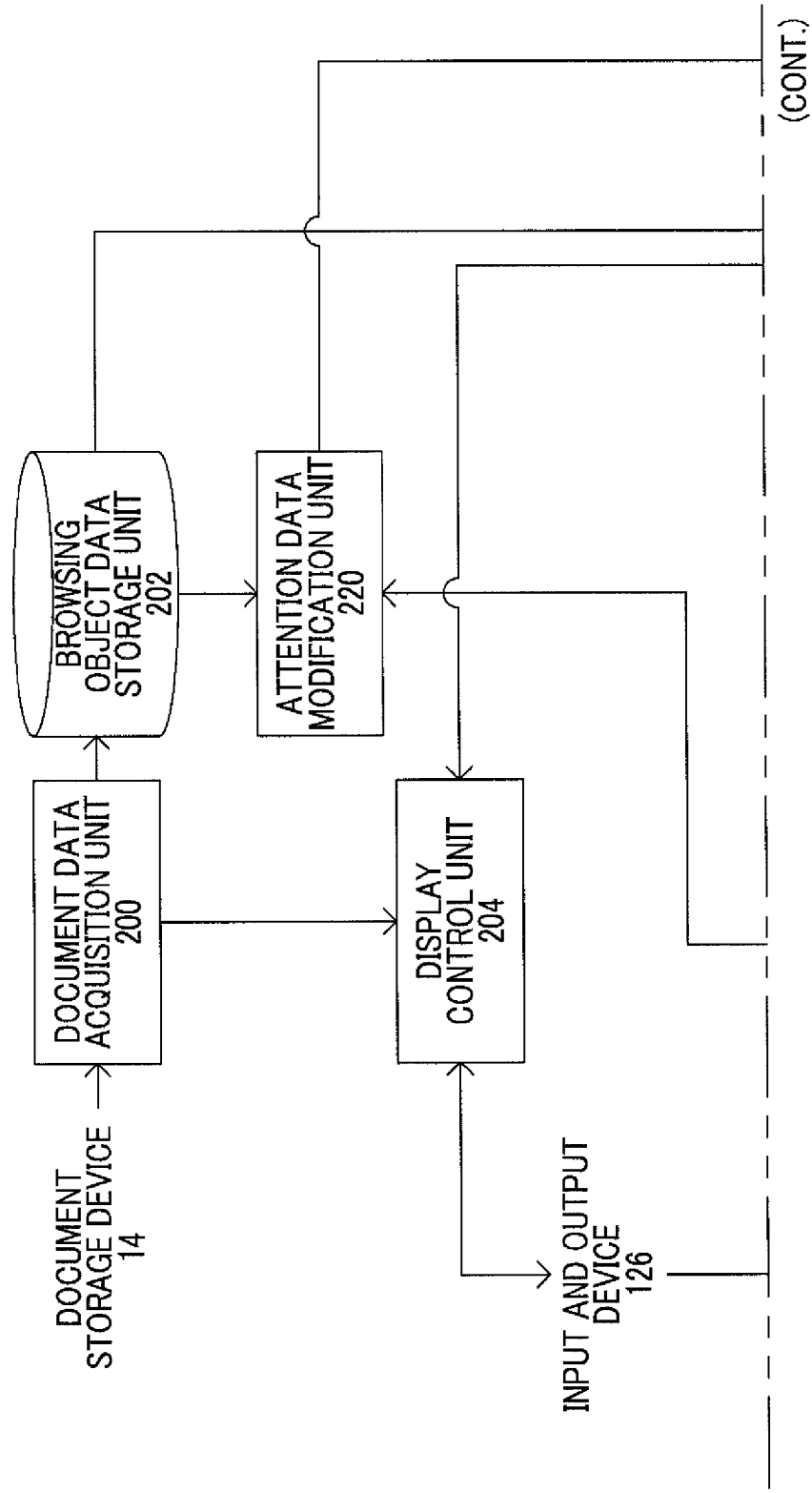

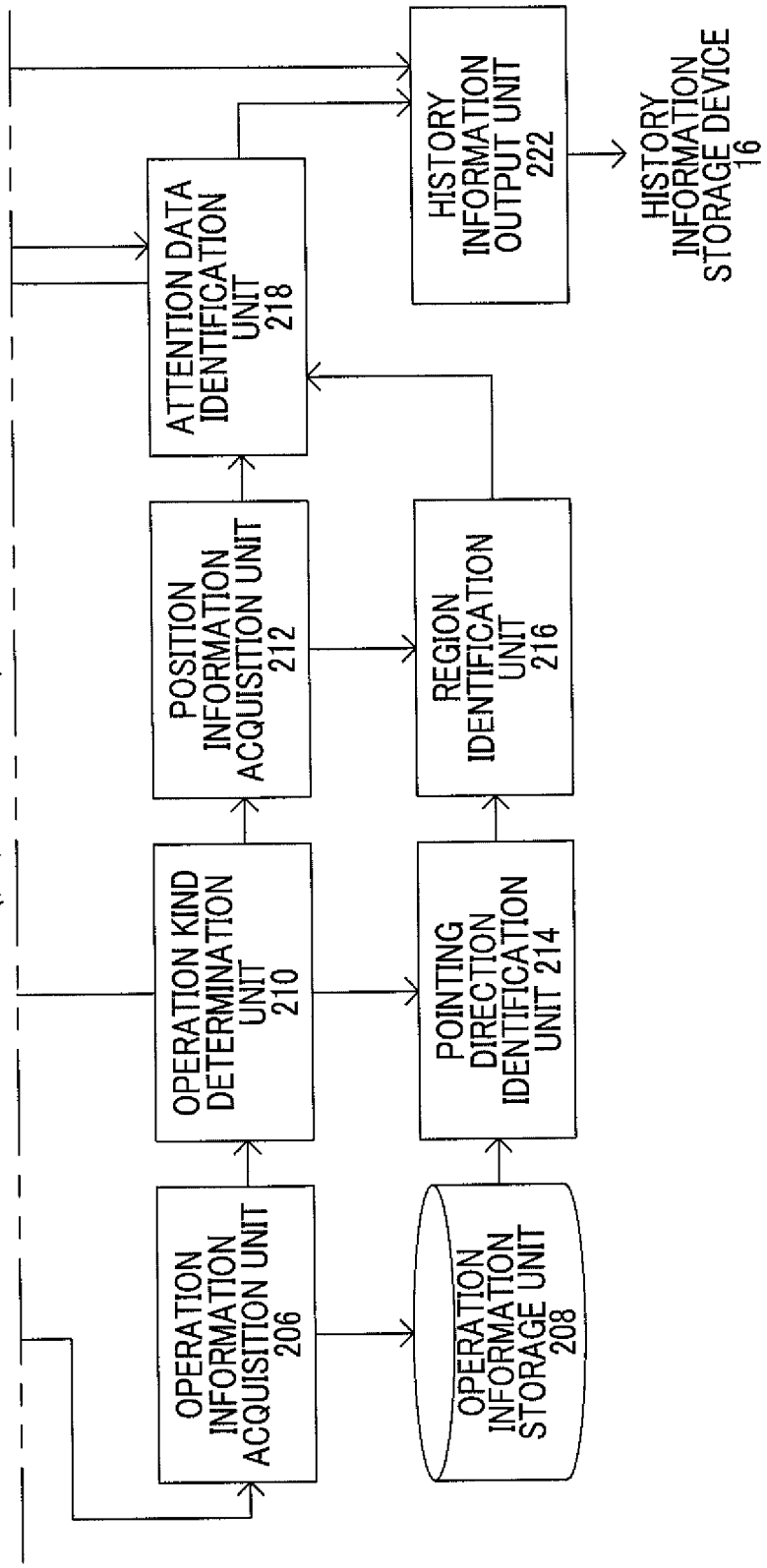

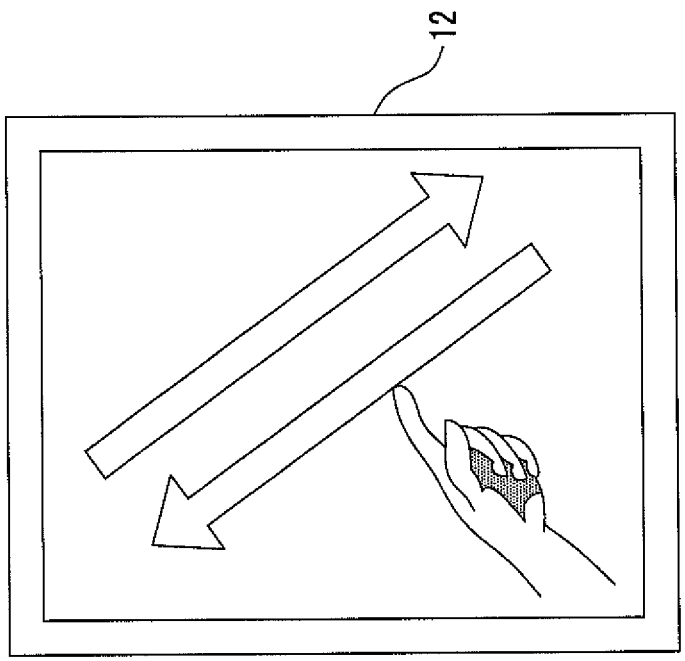
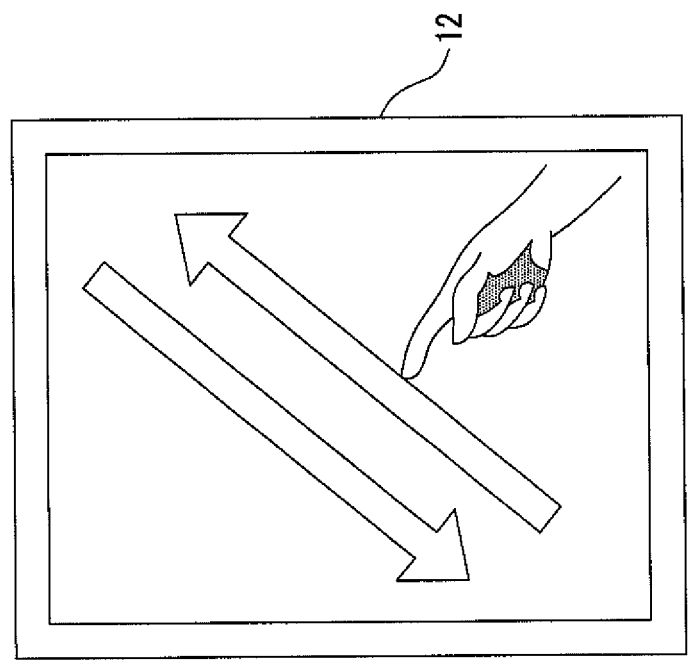

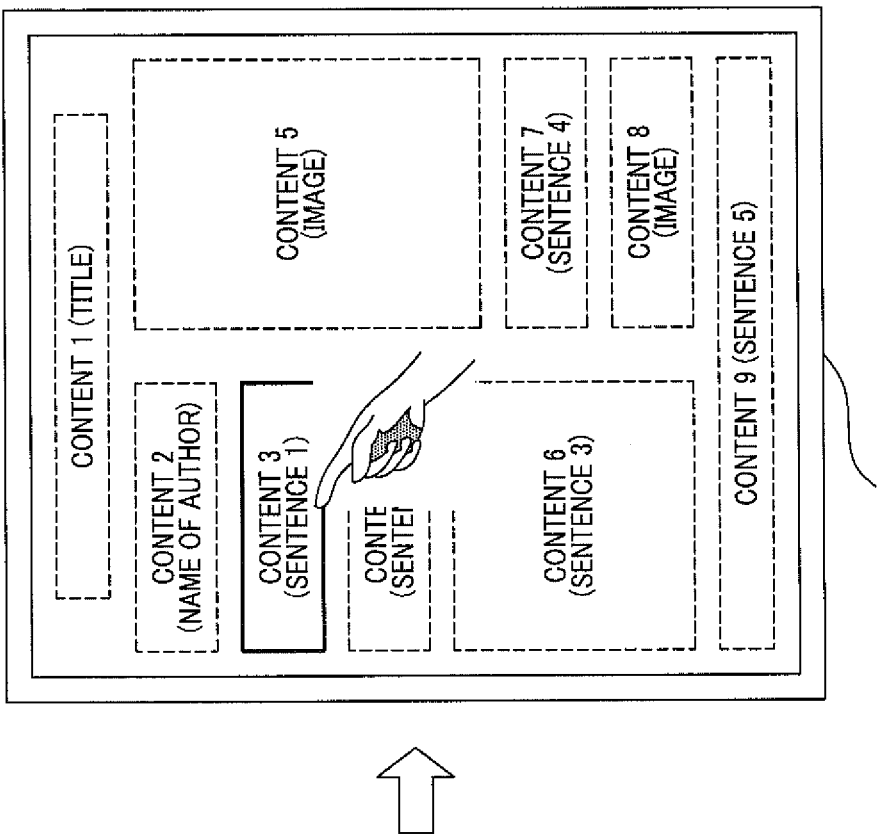
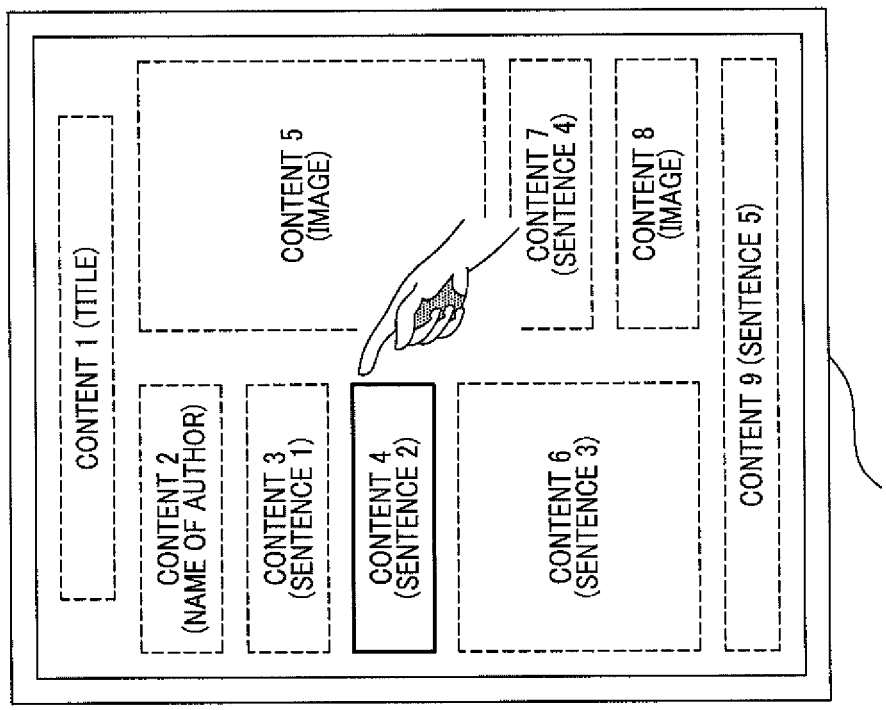

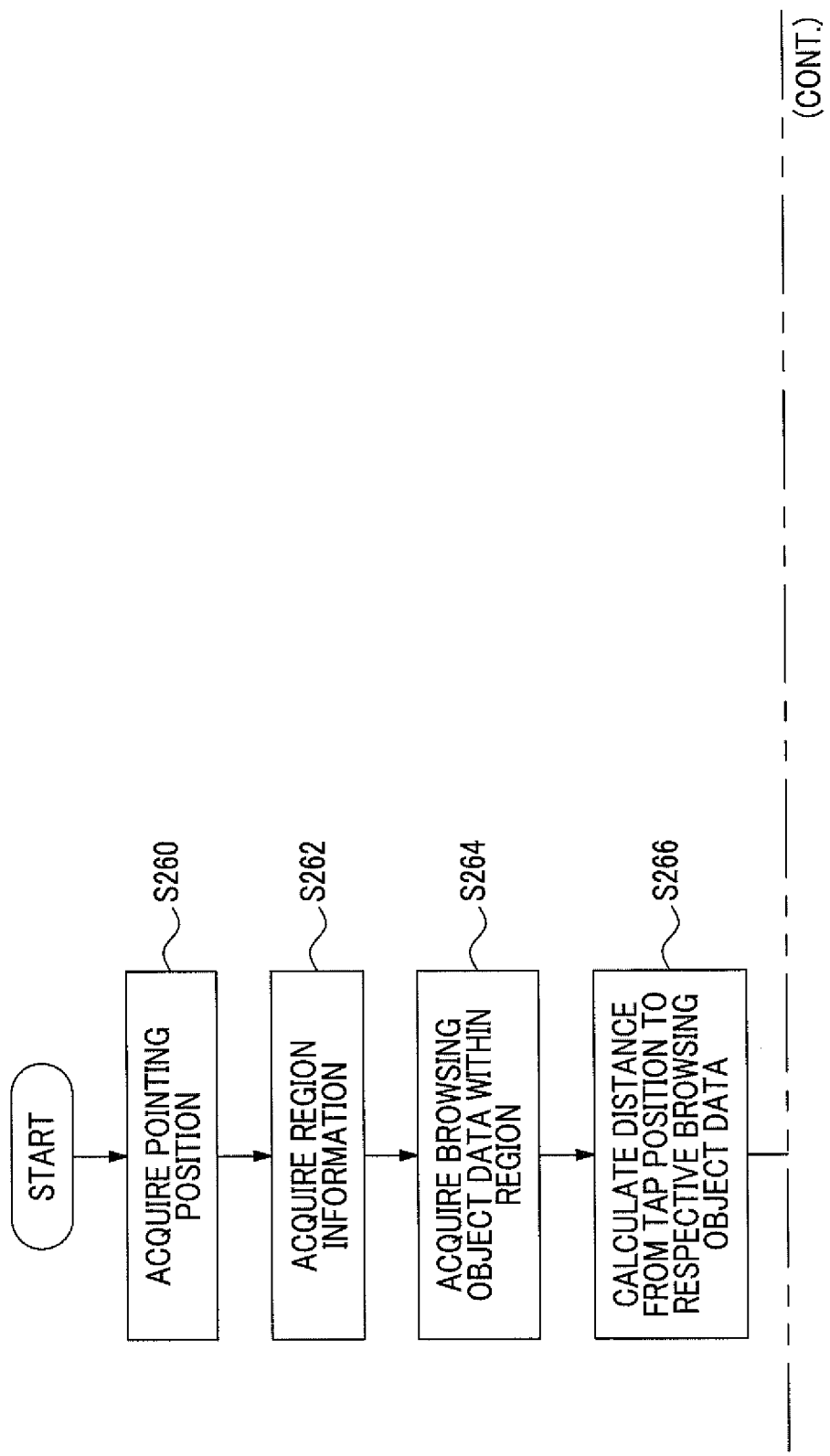

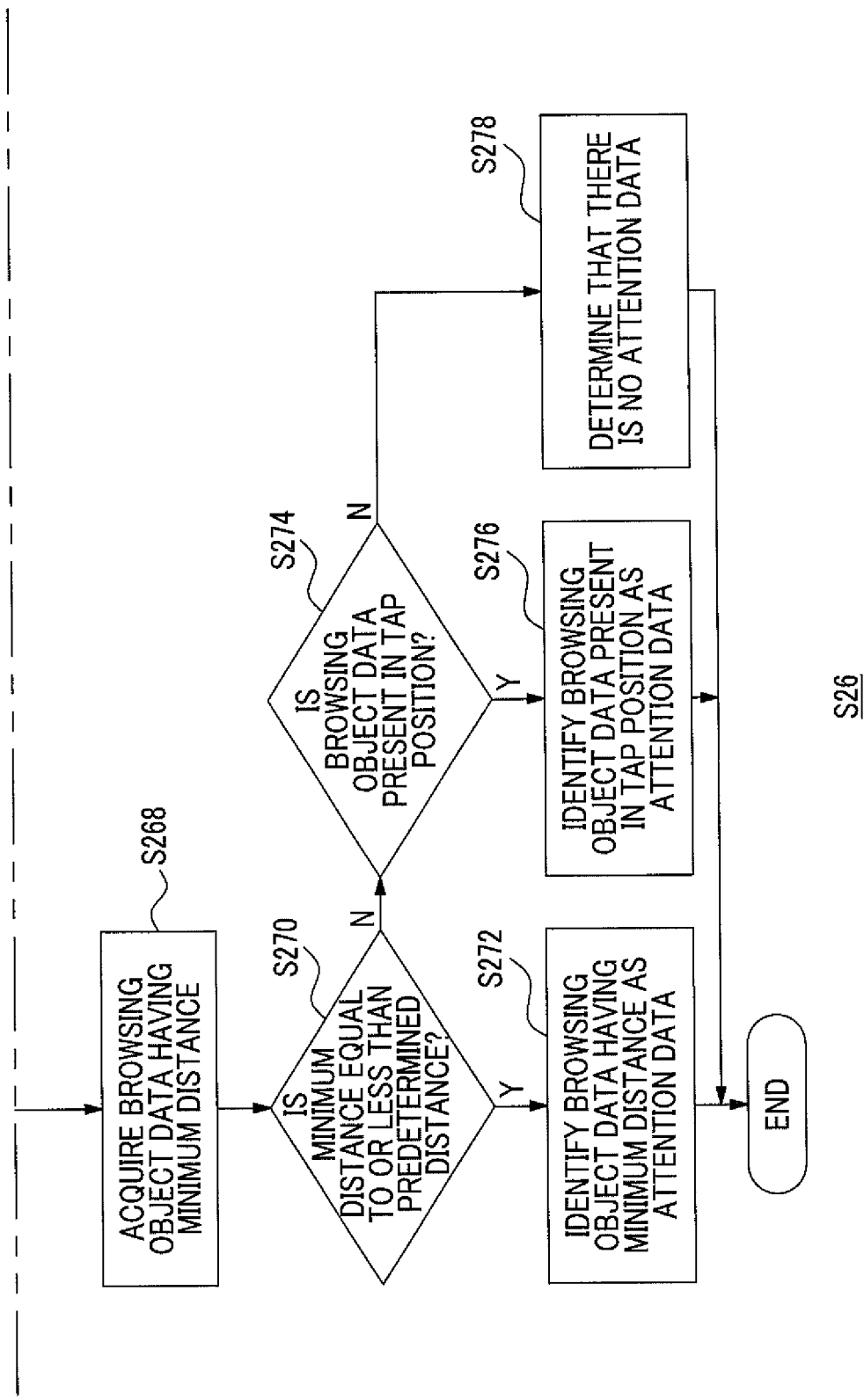

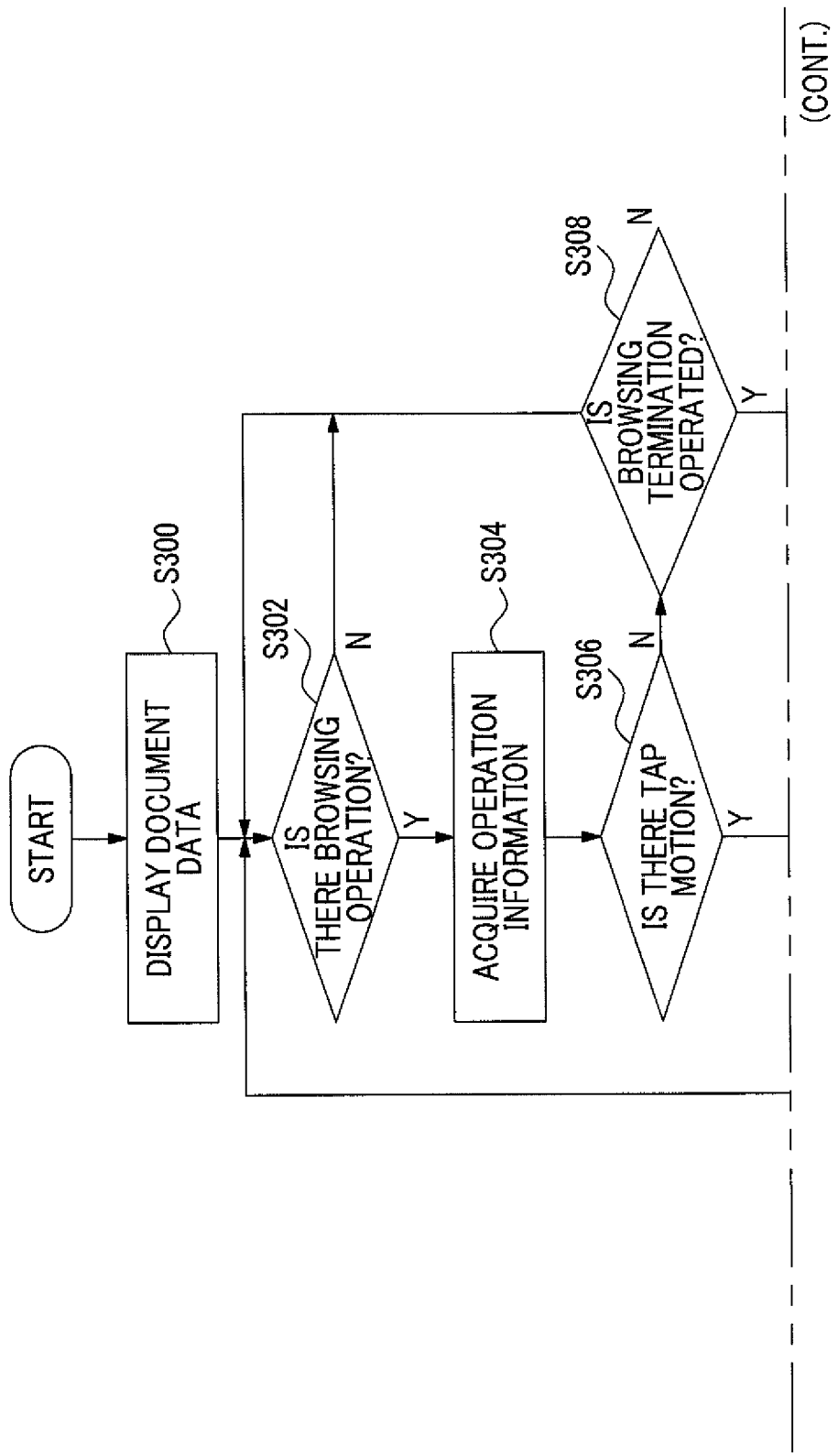

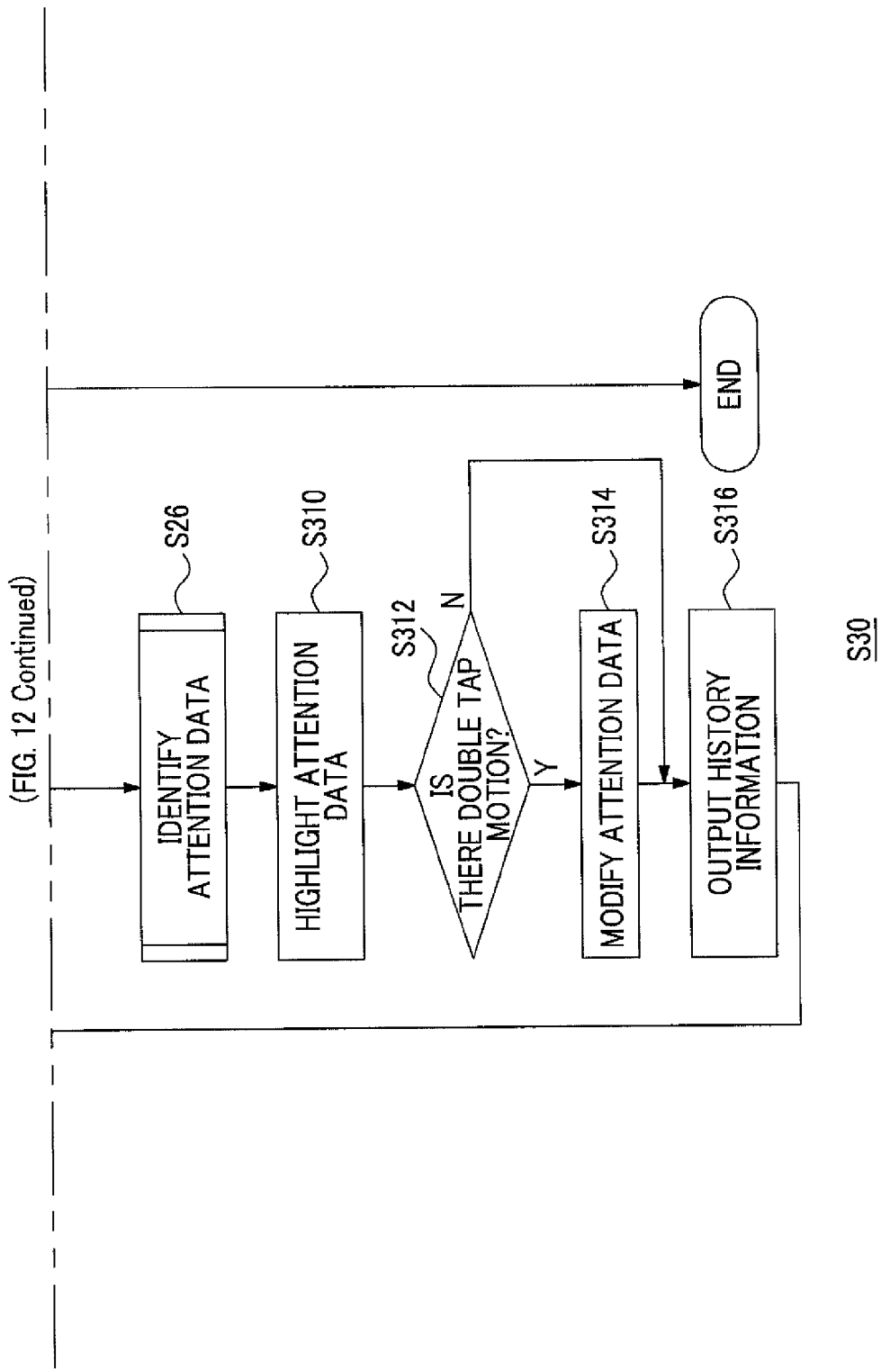

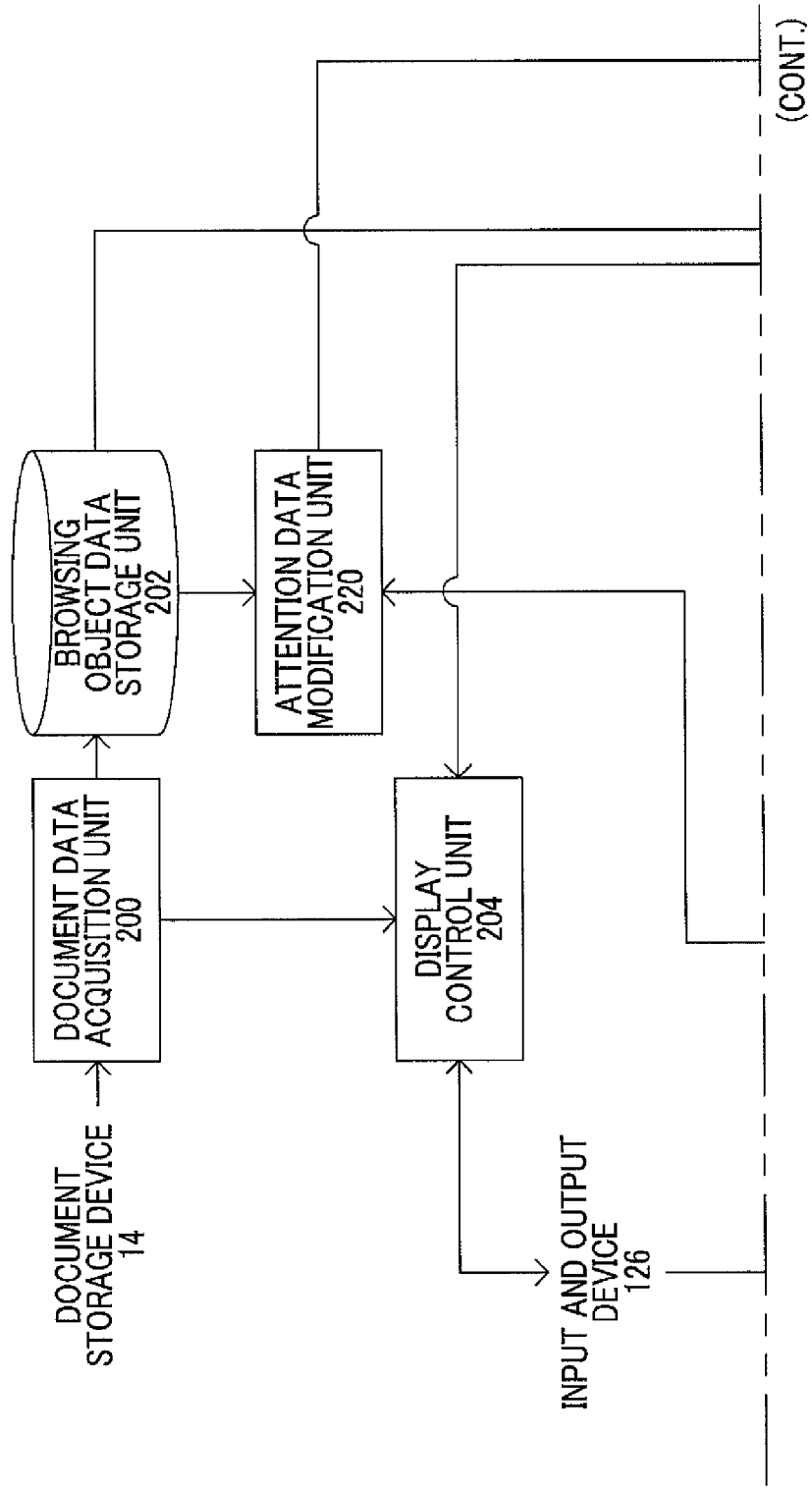

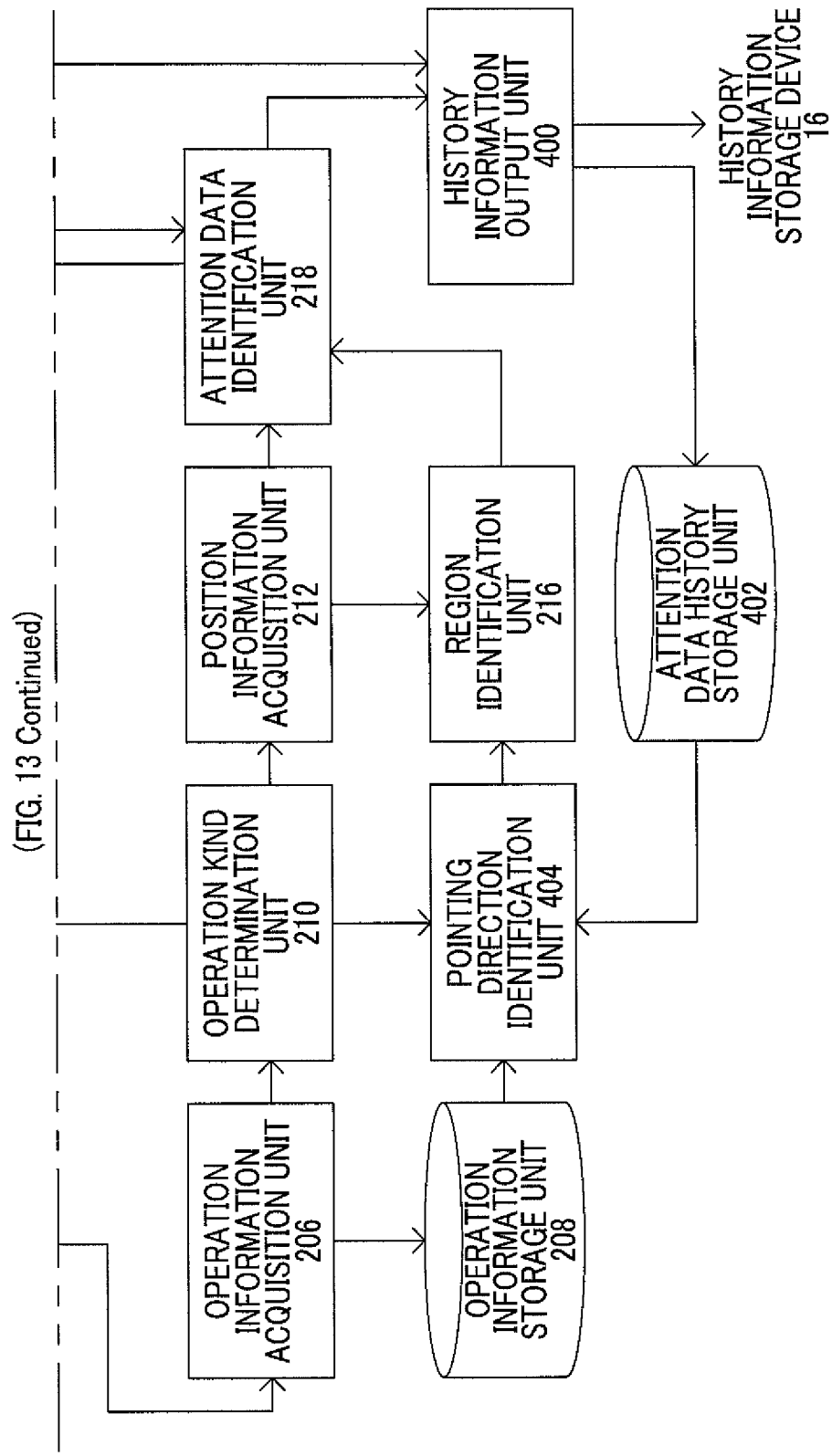

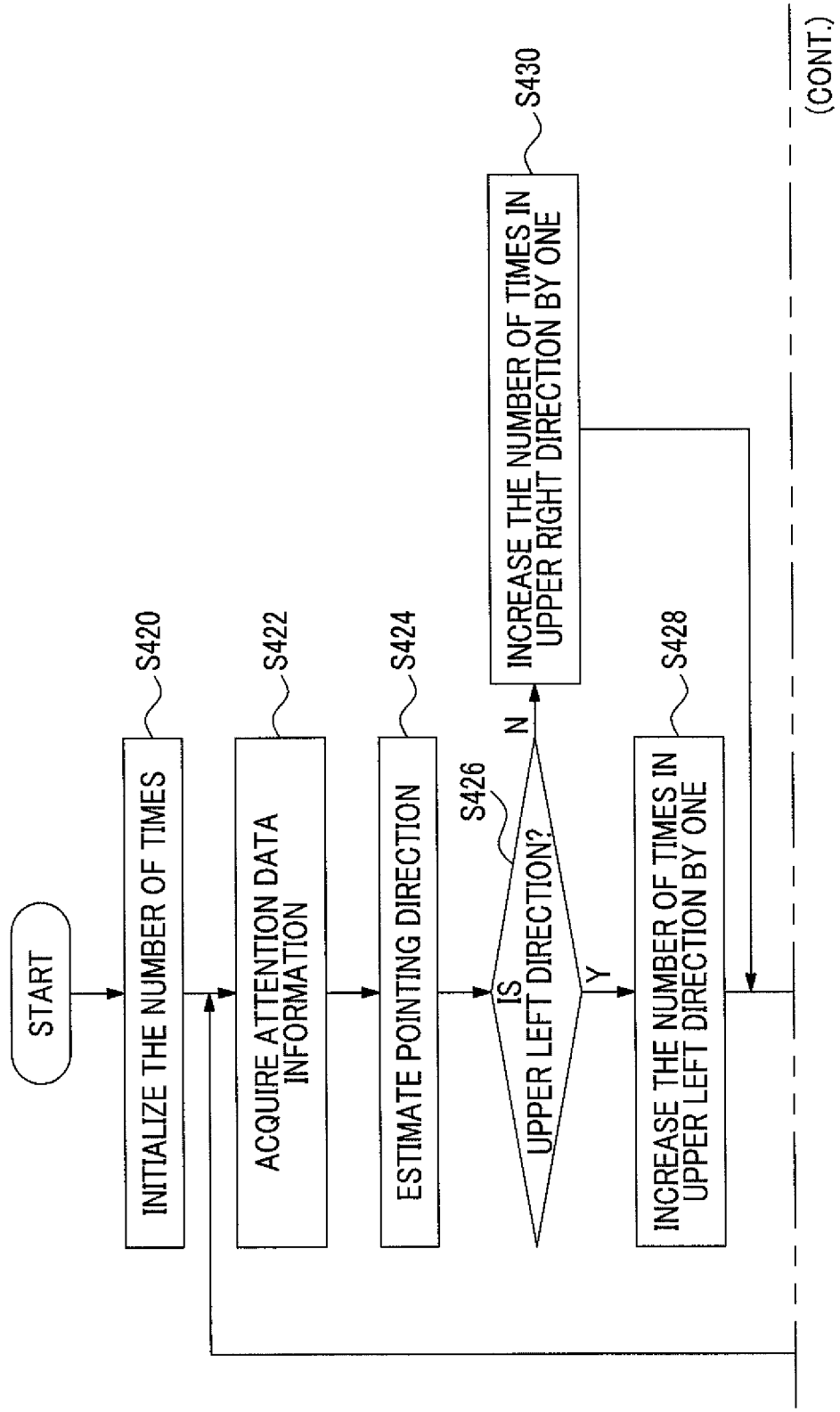

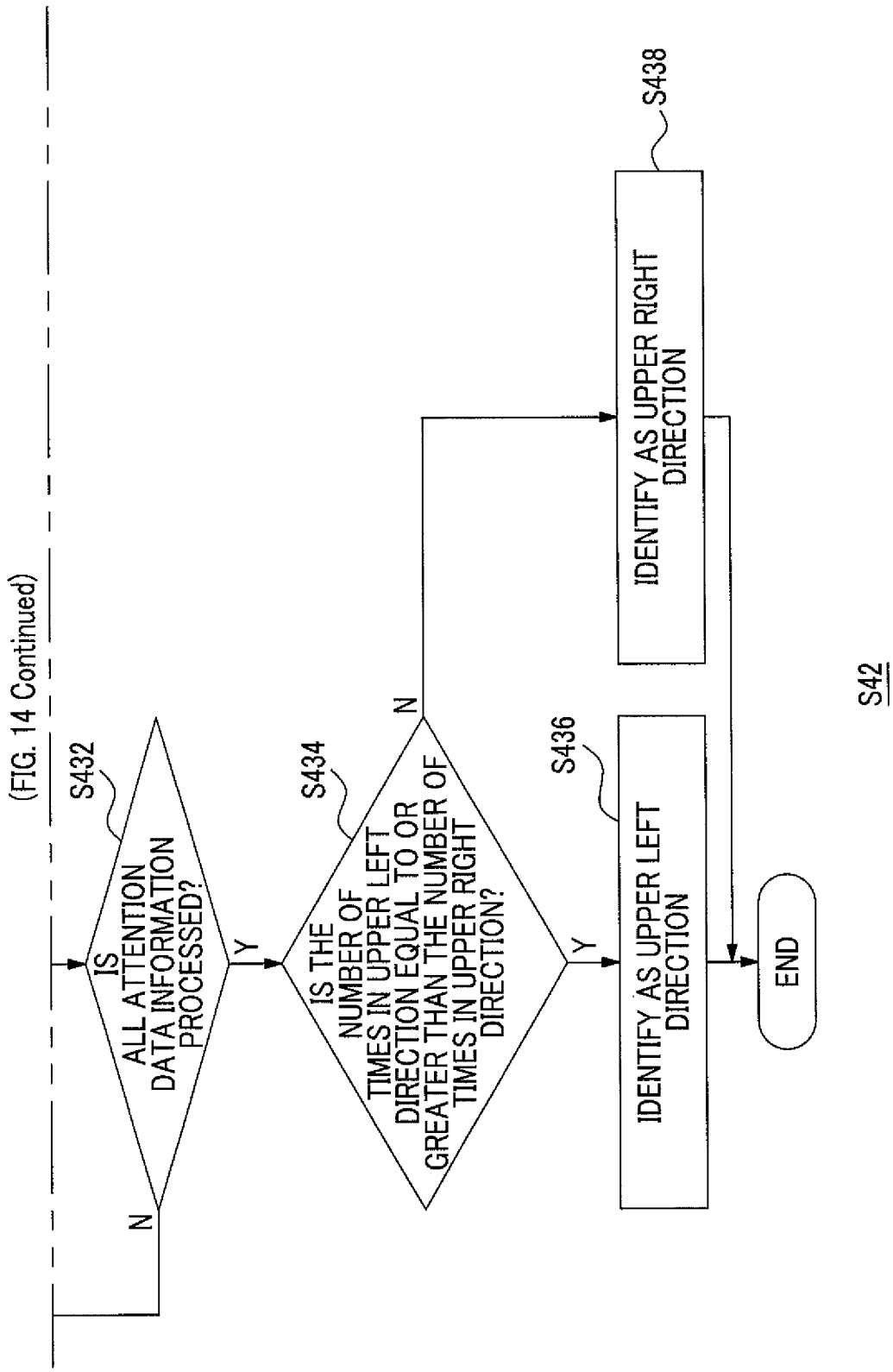

DATA PROCESSING SYSTEM RELATED TO BROWSING

CROSS-REFERENCE TO RELATED APPLICATIONS

This application is based on and claims priority under 35 USC 119 from Japanese Patent Application No. 2013-031322 filed Feb. 20, 2013.

BACKGROUND

Technical Field

The present invention relates to a data processing apparatus, a data processing system, and a non-transitory computer readable medium.

SUMMARY

According to an aspect of the invention, there is provided a data processing apparatus including: a display control unit that controls browsing document data to be displayed, the browsing document data being configured by plural browsing object data items each of which is disposed at a predetermined position; a position information acquisition unit that acquires position information, the position information being pointed by a pointing unit and indicating a position corresponding to the browsing document data displayed by the display control unit; a direction identification unit that identifies a direction pointed by the pointing unit, starting from the pointed position, based on a history of a motion by the pointing unit when the browsing document data is browsed; and an attention data identification unit that identifies attention data indicating browsing object data that is focused, among the plural browsing object data items, based on the position information acquired by the position information acquisition unit and a direction identified by the direction identification unit.

BRIEF DESCRIPTION OF THE DRAWINGS

Exemplary embodiments of the present invention will be described in detail based on the following figures, wherein:

FIG. 4 is a diagram exemplifying a configuration of a first program to be performed on the data processing apparatus illustrated in FIGS. 1 and 2;

FIG. 5A is a diagram exemplifying a trajectory of a finger in a case of performing a swipe motion with a right finger in a display screen of the data processing apparatus illustrated in FIG. 1;

FIG. 5B is a diagram exemplifying a trajectory of a finger in a case of performing the swipe motion with a left finger in the display screen of the data processing apparatus illustrated in FIG. 1;

FIG. 7A is a diagram exemplifying a display screen in which a square frame corresponding to the attention data identified by an attention data identification unit illustrated in FIG. 4 is highlighted;

FIG. 7B is a diagram exemplifying a display screen in which a square frame corresponding to the attention data selected and modified by a double tap motion being performed is highlighted;

FIG. 8 is a flow chart exemplifying an attention data identification process of the attention data identification unit illustrated in FIG. 4;

FIG. 12 is a flow chart illustrating a motion example of the data processing system illustrated in FIG. 1;

FIG. 13 is a diagram exemplifying a configuration of a second program to be performed on the data processing apparatus illustrated in FIGS. 1 and 2;

FIG. 14 is a flow chart exemplifying a painting direction identification process of a second pointing direction identification unit illustrated in FIG. 13;

DETAILED DESCRIPTION (First Exemplary Embodiment)

Hereinafter, a first exemplary embodiment of the present invention will be described.

Figure 1:
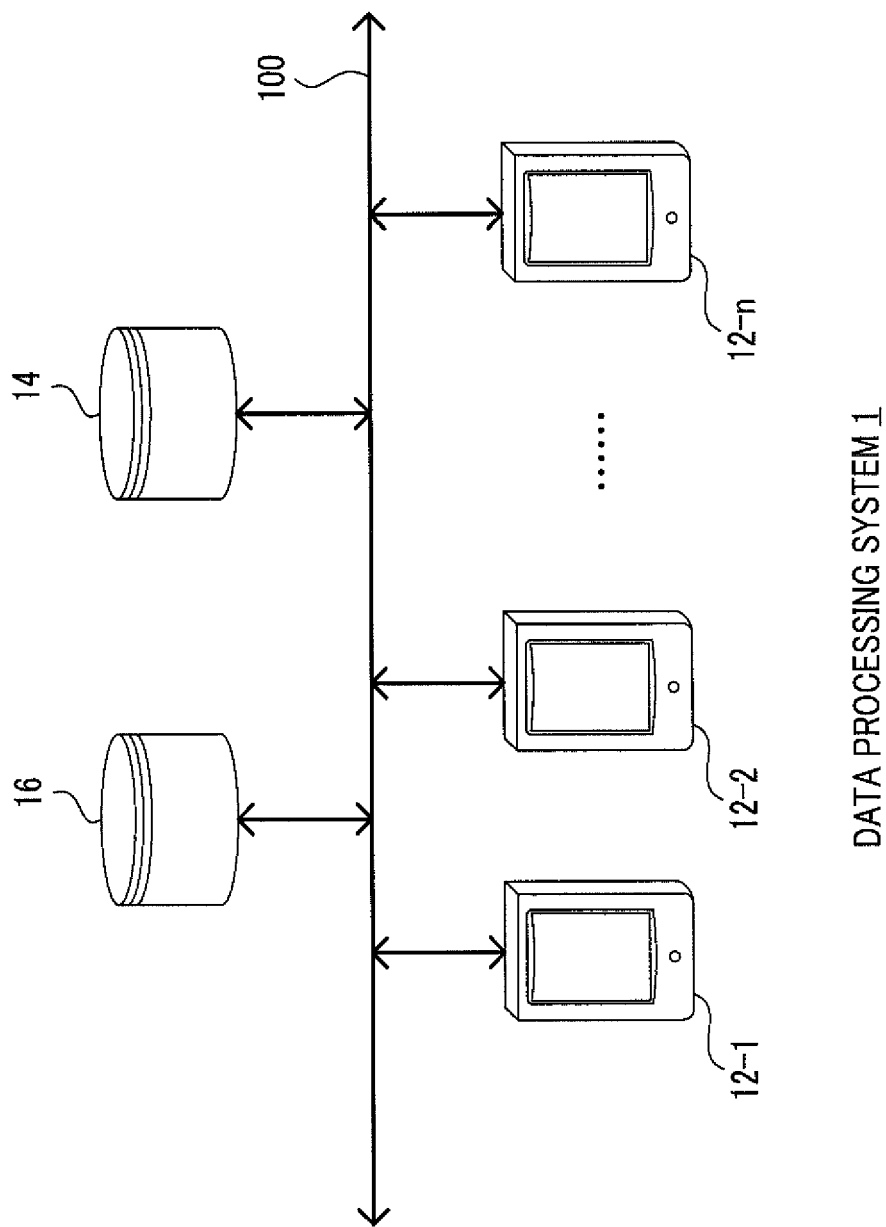
FIG. 1 is a diagram illustrating a configuration of a data processing system according to a present exemplary embodiment.

As illustrated in FIG. 1, the data processing system 1 is configured by data processing apparatuses 12 such as tablet terminals that display document data for browsing, described later (hereinafter, referred to as "browsing document data"), and perform various processes on the displayed browsing document data based on browsing operations, a document storage device 14 that stores browsing document data downloaded by the data processing apparatuses 12, and a history information storage device 16 that stores the history information that is output by browsing a document using the data processing apparatuses 12 -1 to 12-n, which are connected with each other through a network 100 such as Local Area Network (LAN).

The data processing system 1 identifies, using the configuration components thereof, attention data from plural browsing object data items that configure the browsing document data, based on a pointing position pointed by a pointing unit in displayed browsing document data, and a direction pointed by the pointing unit, starting from the pointing position. The data processing system 1 stores, as the history information, the attention data, a time when the attention data is focused, and the like.

The pointing unit refers to, for example, the finger of a viewer, a touch pen, or a laser pointer for operating a tablet terminal.

Further, the attention data refers to browsing object data that is estimated to be focused by the viewer using the pointing unit, among plural browsing object data items.

In addition, hereinafter, any one of plural configuration components, such as data processing apparatuses 12-1 to 12-n, may be simply referred to as a data processing apparatus 12.

Further, in each drawing, the same reference numerals are attached to the substantially same configuration components and processes.

(Hardware Configuration)

Figure 2:
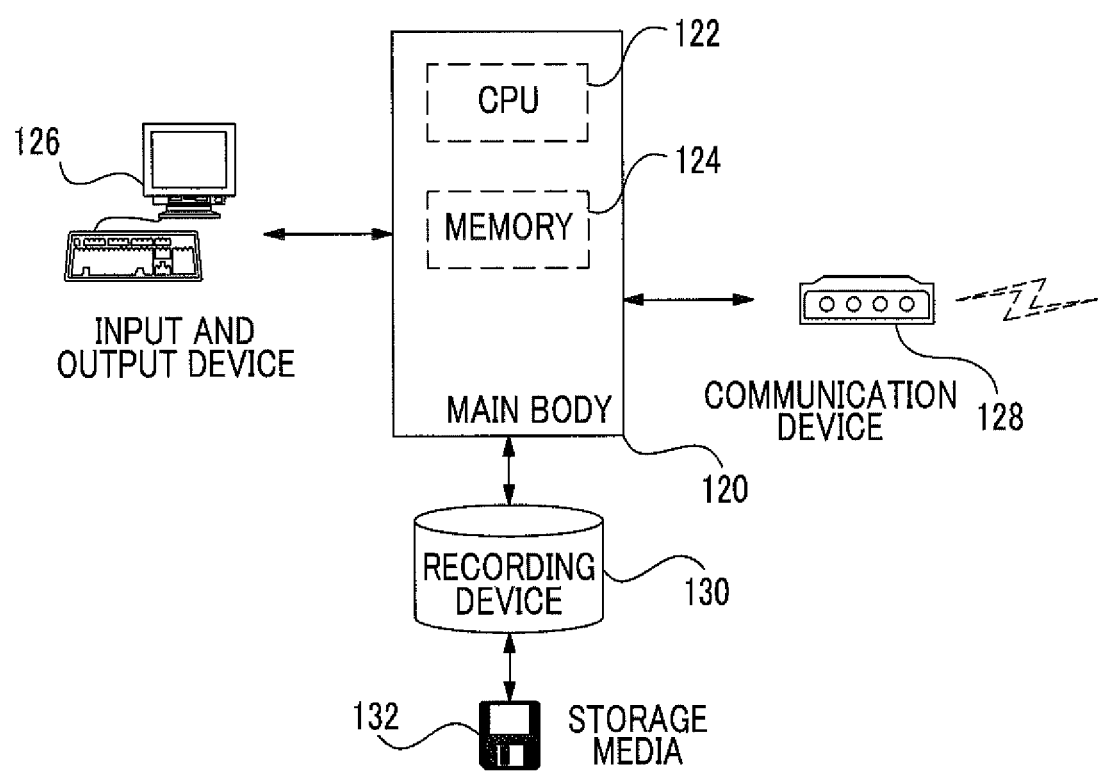
FIG. 2 is a diagram illustrating a hardware configuration of the data processing apparatus illustrated in FIG. 1.

FIG. 2 is a diagram illustrating a hardware configuration of the data processing apparatus 12 illustrated in FIG. 1.

As illustrated in FIG. 2, the data processing apparatus 12 is configured by a main body 120 including a CPU 122, a memory 124, and the like, an input and output device 126 such as a touch panel, a communication device 128 that performs a data communication, and a recording device 130 that writes and reads data to and from a storage media 132 such as a Hard Disk (HD), a Compact Disc (CD), a Digital Versatile Disc (DVD), a Floppy Disc (FD), non-volatile memory, and USB memory.

In other words, the data processing apparatus 12 has configuration components as a computer that may perform a display of data, an information processing such as identification of necessary data, and a data communication with other apparatuses.

(Browsing Document Data)

Figure 3:
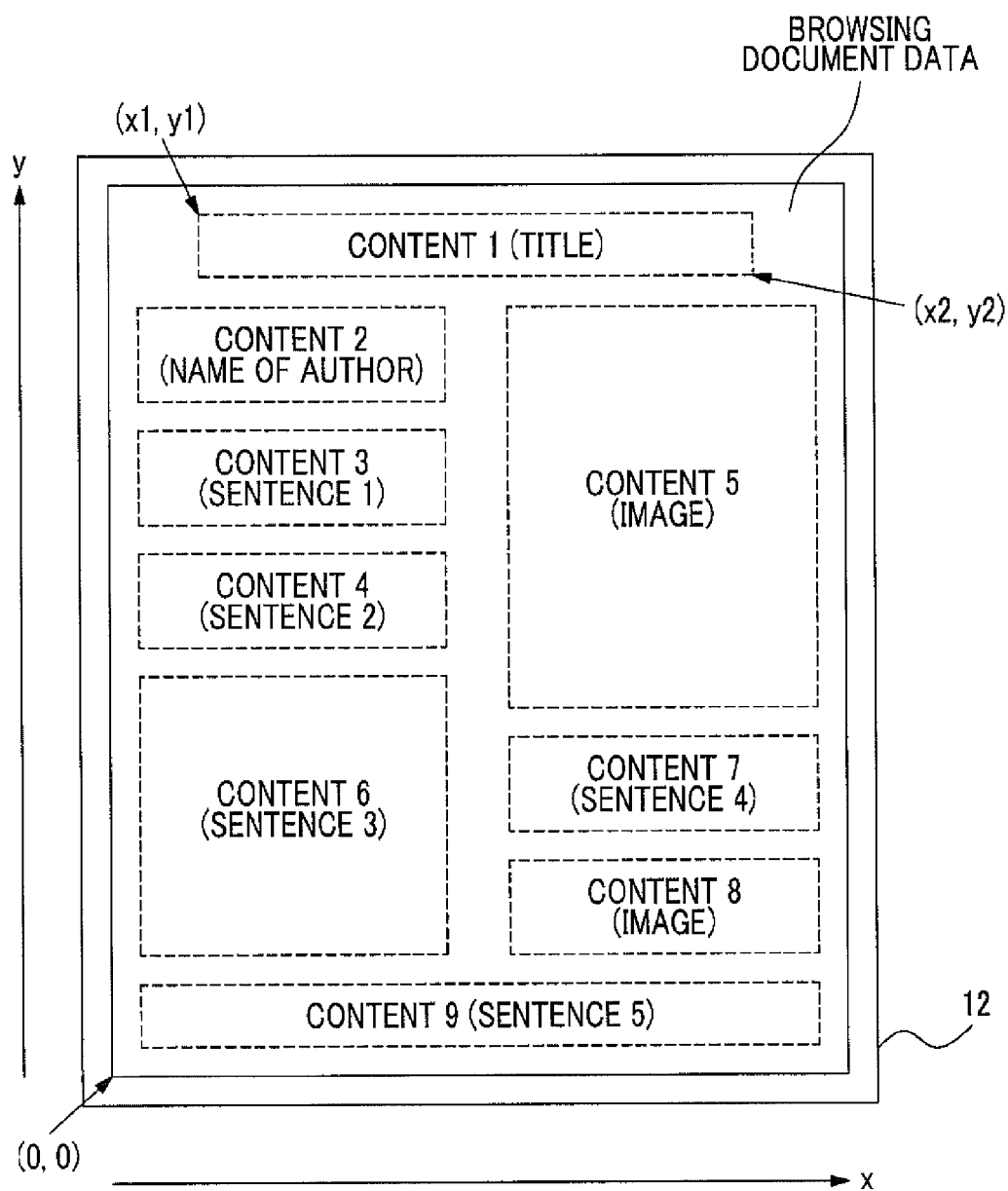
FIG. 3 is a diagram exemplifying browsing document data displayed on the data processing apparatus illustrated in FIG. 1.

FIG. 3 is a diagram exemplifying browsing document data displayed on the data processing apparatus 12 (FIGS. 1 and 2).

Hereinafter, the browsing document data will be described.

The browsing document data refers to, for example, electronic documents created using software and computerized documents by scanning paper documents so as to be computerized.

As illustrated in FIG. 3, the browsing document data is configured by, for example, browsing object data items that are present within square frames of broken lines disposed at a predetermined position.

The browsing object data refers to for example, contents (elements) such as a title, a name of an author, a sentence, a character string, a character, an image, a graph, a table, and the like of a browsing document.

For example, the browsing document data illustrated in FIG. 3 is configured by nine contents (browsing object data items), content 1 refers to the title of the browsing document, content 2 refers to the name of author of the browsing document, contents 3, 4, 6, 7 and 9 each refers to certain sentences, and contents 5 and 8 each refers to certain images.

Placement position information indicating a position at which the browsing object data is placed in identification information and browsing document data are uniquely determined is added to each piece of browsing object data in advance.

The placement position information includes, for example, an upper left vertex and a lower right vertex of the square frame corresponding to the browsing object data.

Further, as illustrated in FIG. 3, a left end of the browsing document displayed in a browsing direction is set to 0, a position at x in a lateral direction and y in a vertical direction is denoted by coordinate (x, y).

For example, as illustrated in FIG. 3, placement position information of the content 1 includes a position of an upper left vertex (x1, y1) and a position of a lower right vertex (x2, y2).

In addition, in the present exemplary embodiment, as described above, although a case in which the identification information and the placement position information are added in advance to each piece of browsing object data is described as a specific example, without being limited thereto, the identification information and the placement position information may be assigned to each piece of browsing object data in a certain manner in which the data processing apparatus 12 performs a process of adding identification information corresponding to the browsing object data and a process of extracting the placement position information at each time when the browsing document data is downloaded by the data processing apparatus 12.

(First Data Processing Program)

FIG. 4 is a diagram exemplifying a configuration of a first data processing program 20 to be performed on the data processing apparatus 12 illustrated in FIGS. 1 and 2.

As illustrated in FIG. 4, the data processing program 20 is configured by a document data acquisition unit 200, a browsing object data storage unit 202, a display control unit 204, an operation information acquisition unit 206, an operation information storage unit 208, an operation kind determination unit 210, a position information acquisition unit 212, a first pointing direction identification unit 214, a region identification unit 216, an attention data identification unit 218, an attention data modification unit 220 and a first history information output unit 222.

The data processing program 20 is loaded, for example, to the memory 124 of the data processing apparatus 12 through a storage media 132 (FIG. 2), and executed specifically using hardware resources of the data processing apparatus 12 on an OS (not shown) that operates in the data processing apparatus 12.

The data processing program 20 identifies in browsing document data, a pointing position pointed by the pointing unit and a direction pointed by the pointing unit starting from the pointing position, identifies attention data from plural browsing object data items based on the identified direction, and outputs the attention data, a time when the attention data is focused (that is, pointed by the pointing unit), and the like as the history information.

In addition, hereinafter, a description will be made of a case where the pointing unit is the finger of the viewer.

The document data acquisition unit 200 acquires browsing document data (FIG. 3) stored in the document storage device 14 (FIG. 1), and outputs the acquired browsing document data to the display control unit 204.

Further, the document data acquisition unit 200 outputs each piece of browsing object data that configures the acquired browsing document data to the browsing object data storage unit 202.

The browsing object data storage unit 202 stores each piece of browsing object data that is input from the document data acquisition unit 200, in a manner capable of being referred by the attention data identification unit 218 and the attention data modification unit 220.

The display control unit 204 controls the browsing document data that is input from the document data acquisition unit 200 to be displayed on the output device of the input and output device 126 (FIG. 2).

Further, the display control unit 204 controls the attention data that is input from the attention data identification unit 218, described later, to be highlighted in the browsing document data displayed on the output device (for example, a square frame corresponding to a position at which attention data is present is displayed by thick lines).

Further, the display control unit 204 receives a selection and modification motion for the browsing object data, described later, and controls the selected and modified browsing object data to be highlighted as the attention data.

The operation information acquisition unit 206 acquires operation information including the content of the browsing operation and a timing at which the browsing operation is performed, whenever a browsing operation is performed using the pointing unit on the browsing document data displayed on the output device of the input and output device 126 (FIG. 2).

Further, the operation information acquisition unit 206 outputs the acquired operation information to the operation information storage unit 208 and the operation kind determination unit 210.

The content of the browsing operation includes the kind of the browsing operation and positional information acquired by the browsing operation.

The kind of the browsing operation includes, for example, a swipe motion (page movement), a pinch-out motion (expansion), a pinch-in motion (reduction), a tap motion (selection of browsing object data), and a double tap motion (selection and modification of browsing object data) with respect to the input and output device 126 (FIG. 2).

Position information includes, for example, in a case of a swipe motion, a position (coordinate) at which the swipe motion is started, position (coordinate) at which the swipe motion is terminated, and an acceleration of the pointing unit at the time of swipe, and in a case of a tap motion, a tapped position (coordinate).

The selection of the browsing object data is not limited to a case of selecting the browsing object data present at a position tapped by the viewer, but includes a case of selecting the browsing object data present at a position pointed from the tapped position.

In a case where attention data identified by the attention data identification unit 218, described later, is different from browsing object data focused by the viewer, the selection and modification of the browsing object data refers to that the browsing object data present at a position doubled-tapped by the viewer is modified as attention data.

The operation information storage unit 208 stores operation information that is input from the operation information acquisition unit 206, in a manner capable of being referred by the pointing direction identification unit 214 from a browsing start to a browsing termination of browsing document data by the viewer.

The browsing start of the browsing document data refers to for example that browsing document data selected by the viewer (that is, the browsing document data acquired by the document data acquisition unit 200) is displayed on the display screen by the display control unit 204. The browsing termination refers that the screen on which the browsing document data is displayed is closed.

The operation kind determination unit 210 determines the kind of the browsing operation included in the operation information that is input from the operation information acquisition unit 206, and outputs operation information to the position information acquisition unit 212, in a case where the kind of the browsing operation refers to the tap motion.

Further, when it is determined that the kind of the browsing operation is the tap motion, the operation kind determination unit 210 notifies to the pointing direction identification unit 214 in order to identify a pointing direction, described later.

Further, when it is determined that the kind of the browsing operation is the double-tap motion, the operation kind determination unit 210 outputs operation information to the attention data modification unit 220.

The position information acquisition unit 212 acquires position information (that is, position information indicating a position tapped by the pointing unit) included in the operation information that is input from the operation kind determination unit 210 and outputs the position information to the region identification unit 216.

In addition, hereinafter, the position tapped by the pointing unit is referred to as "pointing position".

Moreover, the position information acquisition unit 212 outputs operation information to the attention data identification unit 218.

The first pointing direction identification unit 214 identifies a direction (pointing direction) indicated by the pointing unit, starting from the pointing position, referring to the operation information stored in the operation information storage unit 208.

Specifically, for example, the pointing direction identification unit 214, as described later, identifies a left finger or a right finger with which the browsing operation is performed. When the right finger is identified, the pointing direction is identified as the upper left direction from the pointing position, and when the left finger is identified, the pointing direction is identified as the upper right direction from the pointing position.

FIG. 5A is a diagram exemplifying a trajectory of a finger in a case of performing a swipe motion with a right finger in a display screen (input and output device 126 (FIG. 2)) of the data processing apparatus 12, and FIG. 5B is a diagram exemplifying a trajectory of a finger in a case of performing the swipe motion with a left finger in the display screen of the data processing apparatus 12.

As illustrated in FIG. 5A, the swipe motion in which the finger is moved from the lower left to the upper right or from the upper right to the lower left on the display screen is mainly performed with the right finger.

Further, as illustrated in FIG. 5B, the swipe motion in which the finger is moved from the lower right to the upper left or from the upper left to the lower right on the display screen is mainly performed with the left finger.

Based on the aforementioned trend, the pointing direction identification unit 214 (FIG. 4) first acquires the operation information corresponding to the swipe motion that is performed close to the tap motion, out of operation information stored in the operation information storage unit 208.

Next, the pointing direction identification unit 214 identifies the pointing direction by identifying the direction of finger movement on the display screen from the start position and the end position of the swipe motion included in the position information of the acquired operation information and identifying a left finger or a right finger with which the swipe motion is performed.

Further, the pointing direction identification unit 214 outputs the identified pointing direction to the region identification unit 216.

Figure 6B:
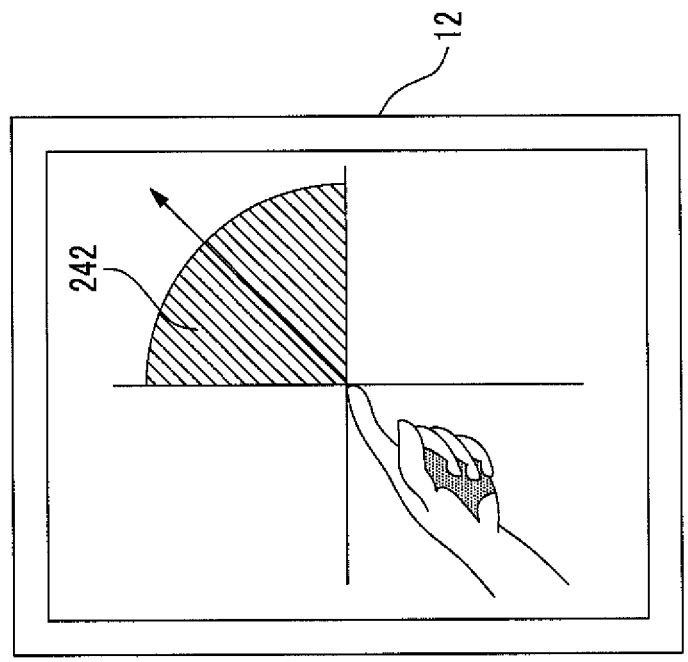
FIG. 6B is a diagram exemplifying an attention region in a case of performing the tap motion with the left finger.
Figure 6A:
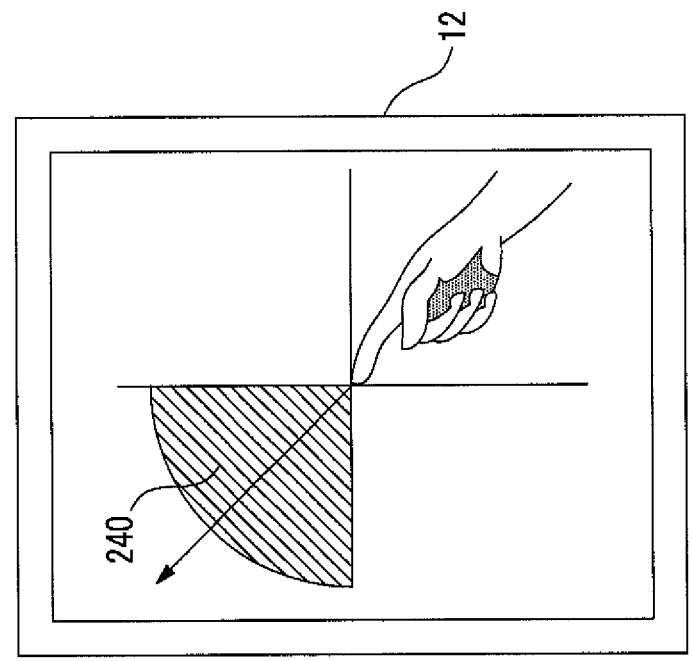
FIG. 6A is a diagram exemplifying an attention region in a case of performing a tap motion with the right finger.

FIG. 6A is a diagram exemplifying a region (hereinafter, referred to as "attention region") in a browsing document including browsing object data (attention data) selected by the viewer in a case of performing a tap motion with the right finger, and FIG. 6B is a diagram exemplifying an attention region including attention data in a case of performing the tap motion with the left finger.

The region identification unit 216 (FIG. 4) identifies a predetermined range in the pointing direction that is input by the pointing direction identification unit 214 as an attention region, based on a position indicated by the position information that is input from the position information acquisition unit 212.

Further, the region identification unit 216 outputs the attention region information indicating the position of the identified attention region to the attention data identification unit 218.

For example, as illustrated in FIG. 6A, in a case of performing the tap motion with the right finger, since the pointing direction refers to the upper left direction, the predetermined range refers to the upper left region 240 which is obtained by dividing the circle of a predetermined radius, centered on a pointing position, into four in a vertical direction and a horizontal direction with respect to the display screen.

Further, for example, as illustrated in FIG. 6A, in a case of performing the tap motion with the left finger, since the pointing direction refers to the upper right direction, the predetermined range refers to an upper right region 242 which is obtained by dividing the circle of a predetermined radius, centered on a pointing position, into four in a vertical direction and a horizontal direction with respect to the display screen.

Further, in the present exemplary embodiment, the region identification unit 216 identifies the region of a fan shape of 90 degree as an attention region, but the shape of the region is not limited thereto.

The attention data identification unit 218 (FIG. 4) identifies attention data, based on the operation information that is input from the position information acquisition unit 212, the attention region information that is input from the region identification unit 216 and each piece of browsing object data stored in the browsing object data storage unit 202 (the details will be described later with a reference to FIGS. 8 to 11).

Further, the attention data identification unit 218 outputs the identified attention data to the display control unit 204, and outputs the identified attention data and operation information to the first history information output unit 222.

The attention data modification unit 220 acquires browsing object data present at the position (double tap position) indicated by the position information included in the operation information corresponding to the double tap motion (that is, selection and modification of browsing object data) that is input from the operation kind determination unit 210.

Specifically, for example, the attention data modification unit 220 acquires browsing object data in which the double tap position is included in a range indicated by the placement position information, out of each piece of browsing object data stored in the browsing object data storage unit 202.

Further, the attention data modification unit 220 outputs the acquired browsing object data as attention data to the first history information output unit 222.

FIG. 7A is a diagram exemplifying a display screen in which a square frame corresponding to the attention data input by an attention data identification unit 218 is highlighted.

FIG. 7B is a diagram exemplifying a display screen in which a square frame corresponding to the attention data selected and modified by a double tap motion being performed is highlighted.

As illustrated in FIG. 7A, the content 4 is identified as attention data by the attention data identification unit 218, but as illustrated in FIG. 7B, the attention data modification unit 220 modifies the attention data from the content 4 to the content 3 by selecting the content 3 by the double tap motion.

The first history information output unit 222 outputs attention data that is input from the attention data identification unit 218 and the timing included in the operation information, as the history information, to the history information storage device 16 (FIG. 1).

Further, when attention data is input from the attention data modification unit 220, the history information output unit 222 outputs the history information in which the attention data that is input from the attention data identification unit 218 is replaced with the attention data that is input from the attention data modification unit 220, to the history information storage device 16.

Further, although the pointing direction identification unit 214 identifies a left finger or a right finger with which the swipe motion is performed in the present exemplary embodiment, the pointing direction identification unit 214 may identify the pointing direction by identifying a left finger or a right finger with which a pinch-out motion and a pinch-in motion are performed.

For example, in the display screen, when the termination position of the pinch-out motion is indicated in the upper right direction and the lower left direction from the start position, it is frequently performed with the right finger. When the termination position of the pinch-out motion is indicated in an upper left direction and a lower right direction from the start position, it is frequently performed with the left finger.

The pointing direction identification unit 214 may identify the pointing direction based on such a trend in the pinch-out motion.

Further, although in the present exemplary embodiment, the pointing direction identification unit 214 identifies the pointing direction based on operation information corresponding to the swipe motion performed close to the tap motion, but the pointing direction identification unit 214 may identify the pointing direction based on plural pieces of operation information corresponding to a predetermined number of swipe motions performed before the tap motion.

For example, the pointing direction identification unit 214 may identify the pointing direction by identifying a left finger or a right finger with which each swipe motion is performed, from plural pieces of operation information, identifying that the swipe motion is performed with the right finger, when the number of times when the right finger is identified is greater than that of the left finger, and identifying that the swipe motion is performed with the left finger in another case.

(Attention Data Identification Process)

FIG. 8 is a flow chart exemplifying an attention data identification process of the attention data identification unit 218 illustrated in FIG. 4.

Hereinafter, the attention data identification process of the attention data identification unit 218 will be described further.

At step 260 (S260), the attention data identification unit 218 acquires a position (pointing position) indicated by the position information included in the operation information that is input from the position information acquisition unit 212.

At step 262 (S262), the attention data identification unit 218 acquires the attention region information that is input from the region identification unit 216.

At step 264 (S264), the attention data identification unit 218 acquires browsing object data located within attention region indicated by the attention region information acquired at S262 and not present at the pointing position acquired at S260, out of the browsing object data stored in the browsing object data storage unit 202 (FIG. 4).

Specifically, for example, the attention data identification unit 218 acquires browsing object data in which at least a part of the range indicated by the placement position information is included within the attention region and a pointing position is not included in the range indicated by the placement position information.

Figure 9:
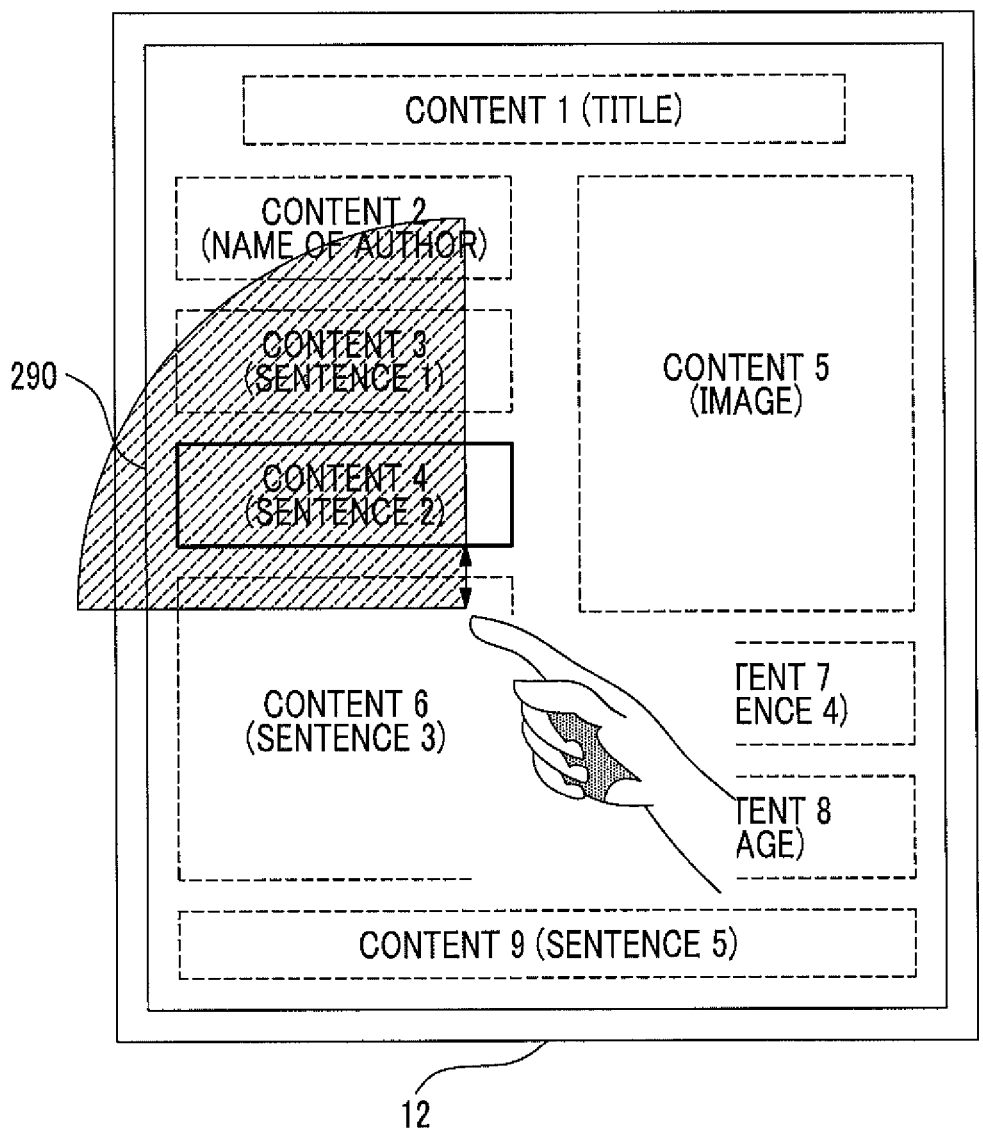
FIG. 9 is a diagram exemplifying a state in which a tap motion is performed with the right finger on a display screen of browsing document data.

FIG. 9 is a diagram exemplifying a state in which a tap motion is performed with the right finger on a display screen of browsing document data.

Figure 10:
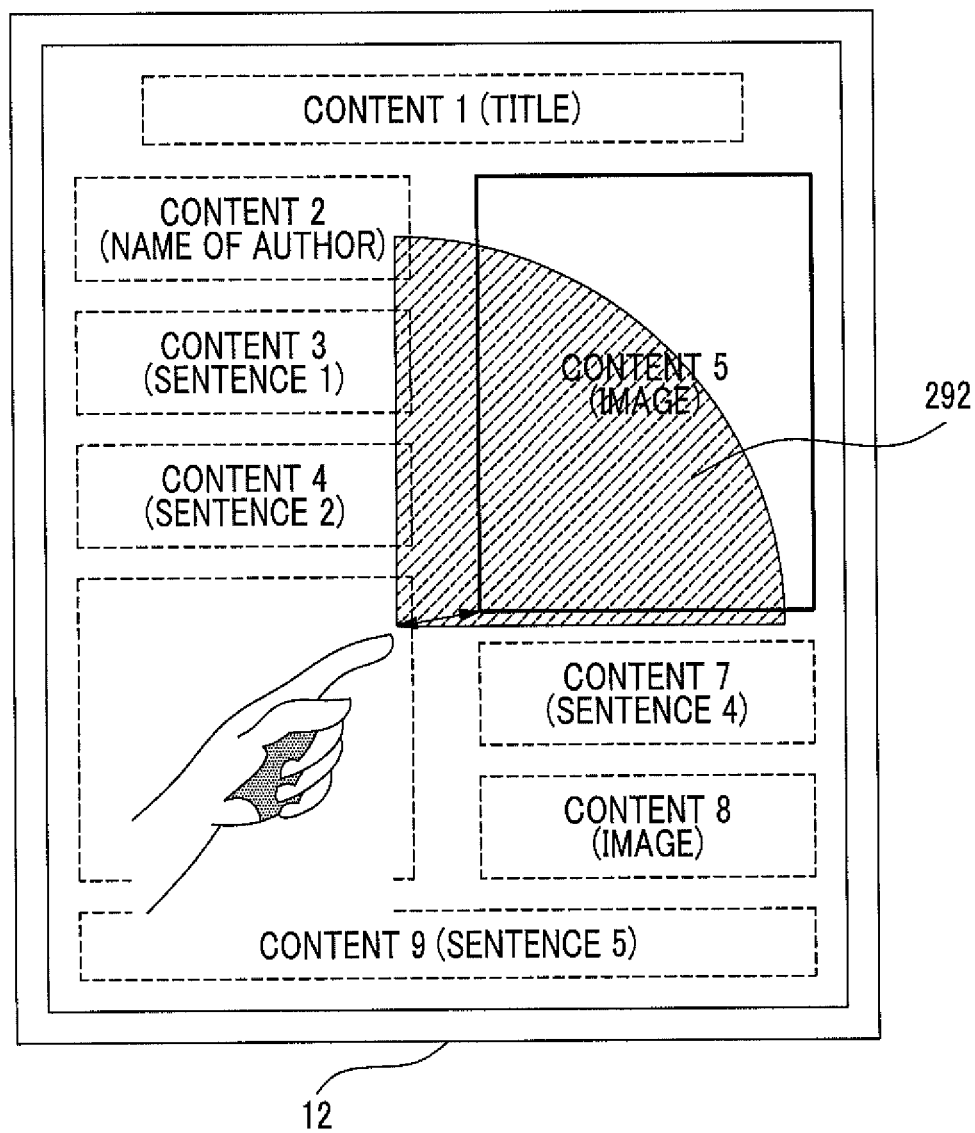
FIG. 10 is a diagram exemplifying a state in which a tap motion is performed with the left finger on a display screen of browsing document data.

FIG. 10 is a diagram exemplifying a state in which a tap motion is performed with the left finger on a display screen of browsing document data.

For example, as illustrated in FIG. 9, the attention data identification unit 218 acquires contents (browsing object data) 2, 3, 4 present within the attention region 290 indicated by the attention region information that is acquired at S262.

Further, for example, as illustrated in FIG. 10, the attention data identification unit 218 acquires contents (browsing object data) 2, 3, 4, 5 present within the attention region 292 indicated by the attention region information that is acquired at S262.

At step 266 (S266; FIG. 8), the attention data identification unit 218 calculates a distance from the pointing position acquired at S260 to each piece of browsing object data acquired at S264.

The distance from the pointing position to the browsing object data refers to, for example, a minimum straight-line distance from the pointing position to a boundary of a square frame (FIG. 3) in which there is browsing object data obtained by the placement position information of the browsing object data.

At step 268 (S268), the attention data identification unit 218 acquires the browsing object data having the minimum distance, out of browsing object data items in which a distance from the pointing position is calculated at S266.

For example, as illustrated in FIG. 9, the attention data identification unit 218 acquires the content 4 having the minimum distance from the pointing position, out of the contents 2, 3, 4 acquired at S264.

Further, for example, as illustrated in FIG. 10, the attention data identification unit 218 acquires the content 5 having the minimum distance from the pointing position, out of the contents 2, 3, 4, 5 acquired at S264.

At step 270 (S270; FIG. 8), the attention data identification unit 218 determines whether a distance from the pointing position to browsing object data acquired at S268 is equal to or less than the predetermined distance.

When the distance is equal to or less than the predetermined distance, the attention data identification unit 218 proceeds to the process of S272, but in another case, the process proceeds to the process of S274.

At step 272 (S272), the attention data identification unit 218 identifies the browsing object data acquired at S268 as attention data, and terminates the process.

At step 274 (S274), the attention data identification unit 218 determines whether there is browsing object data present at the pointing position acquired at S260, out of browsing object data items stored in the browsing object data storage unit 202 (FIG. 4).

When there is browsing object data at the pointing position, the attention data identification unit 218 proceeds to the process of S276, but in another case, the process proceeds to the process of S278.

At step 276 (S276), the attention data identification unit 218 identifies the browsing object data present at the pointing position as attention data, and terminates the process.

Figure 11:
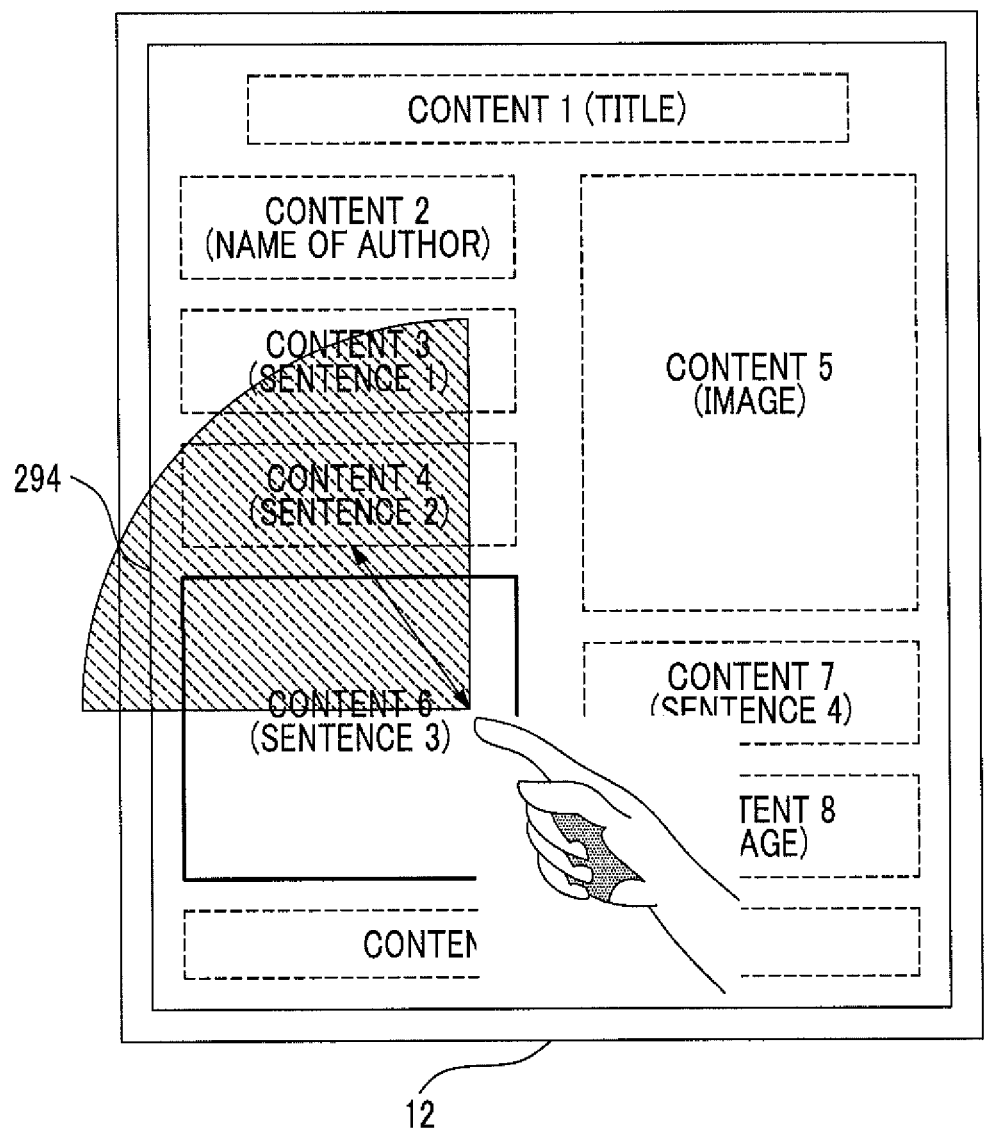
FIG. 11 is a diagram exemplifying a state in which a tap motion is performed with the right finger on a display screen of browsing document data.

FIG. 11 is a diagram exemplifying a state in which a tap motion is performed with the right finger on a display screen of browsing document data.

For example, when a distance from the pointing position to the browsing object data acquired at S268 refers to the distance illustrated in FIG. 9 (the distance from the pointing position to the content 4), the content 4 is identified as attention data and is located at attention region 294.

On the other hand, when a distance from the pointing position to the browsing object data acquired at S268 refers to the distance illustrated in FIG. 11 (the distance from the pointing position to the content 4), since the distance is longer than a predetermined distance, the content 6 present at the pointing position is identified as the attention data.

At step 278 (S278; FIG. 8), the attention data identification unit 218 determines that there is no attention data corresponding to the pointing position, and terminates the process.

In addition, in the present exemplary embodiment, it is determined at S270 whether a minimum distance is equal to or less than a predetermined distance, but irrespectively of the distance, the browsing object data located in the minimum distance from the pointing position may be identified as attention data.

(Motion Example of the Data Processing System 1)

FIG. 12 is a flow chart illustrating a motion example of the data processing system 1 (FIG. 1).

Hereinafter, the motion example of the data processing system 1 will be described further.

At step 300 (S300), the data processing apparatus 12 acquires browsing document data from the document storage device 14, and displays the browsing document data (the document data acquisition unit 200 and the display control unit 204 (FIG. 4)).

At step 302 (S302), the data processing apparatus 12 determines whether a browsing operation is performed on the browsing document data illustrated at S300.

When it is determined that the browsing operation is performed, the data processing apparatus 12 proceeds to the process of S304, but in another case, the process remains at S302.

At step 304 (S304), the data processing apparatus 12 acquires the operation information regarding the browsing document data displayed at S300 (operation information acquisition unit 206 (FIG. 4)).

At step 306 (S306), the data processing apparatus 12 determines whether the operation information acquired at S304 refers to a tap motion (that is, a position pointing motion by the pointing unit) (operation kind determination unit 210 (FIG. 4)).

When it is determined that the operation information refers to the tap motion, the data processing apparatus 12 proceeds to the process of S26 (FIG. 8), but in another case, the process proceeds to the process of S308.

At step 308 (S308), the data processing apparatus 12 determines whether the operation information acquired at S304 refers to the browsing termination operation.

When it is determined that the operation information refers to the browsing termination operation, the data processing apparatus 12 terminates the process, but in another case, the process proceeds to the process of S302.

At step 310 (S310), the data processing apparatus 12 highlights the attention data identified at S26 (display control unit 204 (FIG. 4)).

At step 312 (S312), the data processing apparatus 12 determines whether a double-tap motion (that is, selection and modification motion of browsing object data) is performed (operation information acquisition unit 206 and operation kind determination unit 210 (FIG. 4)).

When it is determined that the double tap motion is performed, the data processing apparatus 12 proceeds to the process of S314, but in another case, the process proceeds to the process of S316.

At step 314 (S314), the data processing apparatus 12 modifies the attention data acquired at S26 to browsing object data present at a position indicated by the position information included in the operation information corresponding to the double tap motion (attention data modification unit 220 (FIG. 4)).

At step 316 (S316), the data processing apparatus 12 outputs the attention data and the timing included in the operation information acquired at S304, as the history information, to the history information storage device 16, and returns to the process of S302 (history information output unit 222 (FIG. 4)).

(Second Exemplary Embodiment)

Hereinafter, a second exemplary embodiment of the present invention will be described.

In the second exemplary embodiment of the present invention, a pointing direction is identified based on a history in which attention data identified in the first exemplary embodiment of the present invention and corresponding pointing position are associated.

(Second Data Processing Program 40)

FIG. 13 is a diagram exemplifying a configuration of a second data processing program 40 to be performed on the data processing apparatus 12 illustrated in FIGS. 1 and 2 in the second exemplary embodiment.

As illustrated in FIG. 13, the second data processing program 40 has a configuration in which an attention data history storage unit 402 is added to the configuration of the first data processing program 20 (FIG. 4), the first pointing direction identification unit 214 of the first data processing program 20 is replaced with the second pointing direction identification unit 404, and the first history information output unit 222 is replaced with the second history information output unit 400.

The second data processing program 40 identifies a pointing direction based on the history in which the identified attention data and the corresponding pointing position are associated, identifies the attention data from plural browsing object data based on the identified pointing direction, and outputs the attention data, a timing at which the attention data is focused, and the like as the history information.

The second history information output unit 400 outputs the attention data that is input from the attention data identification unit 218 and a timing included in the operation information, as the history information, to the history information storage device 16 (FIG. 1).

Further, when the attention data is input from the attention data modification unit 220, the history information output unit 400 outputs the history information in which the attention data that is input from the attention data identification unit 218 is replaced with the attention data that is input from the attention data modification unit 220, to the history information storage device 16.

Further, history information output unit 400 outputs the attention data that is input from the attention data identification unit 218 or the attention data information including the attention data modified by the attention data modification unit 220 and position information (that is, the position information indicating the pointing position) included in the operation information that is input from the attention data identification unit 218, as attention data history, to the attention data history storage unit 402.

The attention data history storage unit 402 stores attention data history that is input from the history information output unit 400 in a manner capable of being referred by the second pointing direction identification unit 404.

Until the attention data information of a predetermined number is stored in the attention data history storage unit 402, the second pointing direction identification unit 404 determines a pointing direction based on the operation information stored by the operation information storage unit 208, by the same process as that of the first pointing direction identification unit 214 in the first exemplary embodiment.

Further, after a predetermined number of attention data information is stored, the pointing direction identification unit 404 identifies a pointing direction based on the attention data history stored by the attention data history storage unit 402 (the detail will be described with reference to FIG. 14).

(Pointing Direction Identification Process)

FIG. 14 is a flow chart exemplifying a pointing direction identification process of a pointing direction identification unit 404 illustrated in FIG. 13.

Hereinafter, the pointing direction identification process of the pointing direction identification unit 404 will be described.

At step 420 (S420), the pointing direction identification unit 404 initializes the number of times (the number of times of an upper left direction) at which the pointing direction is estimated as the upper left direction and the number of times (the number of times of an upper right direction) at which the pointing direction is estimated as the upper right direction (for example, the number of times is zero).

At step 422 (S422), the pointing direction identification unit 404 acquires attention data information from attention data history.

At step 424 (S424), the pointing direction identification unit 404 estimates a pointing direction from the attention data information acquired at S422.

Specifically, for example, when the attention data included in the attention data information is present at the upper left region which is obtained by dividing the circle into four in a vertical direction and a horizontal direction with respect to the display screen, centered on the pointing position included in the attention data information, the pointing direction identification unit 404 estimates the pointing direction as the upper left direction.

Further, for example, when the attention data is present at the upper right region which is obtained by dividing the circle into four in a vertical direction and a horizontal direction with respect to the display screen, centered on the pointing position, the pointing direction identification unit 404 estimates the pointing direction as the upper right direction.

At step 426 (S426), the pointing direction identification unit 404 determines whether the pointing direction estimated at S424 is the upper left direction.

When it is determined that the pointing direction is the upper left direction, the pointing direction identification unit 404 proceeds to the process of S428, but in another case, the process proceeds to the process of S430.

At step 428 (S428), the pointing direction identification unit 404 increases the number of times in the upper left direction by one.

At step 430 (S430), the pointing direction identification unit 404 increases the number of times in the upper right direction by one.

At step 432 (S432), the pointing direction identification unit 404 determines whether or not to estimate pointing directions with respect to all pieces of attention data information of attention data history.

When the estimation of the pointing direction is completed with respect to all pieces of attention data information, the pointing direction identification unit 404 proceeds to the process of S434, but in another case, the process proceeds to the process of S422.

At step 434 (S434), the pointing direction identification unit 404 determines whether the number of time in the upper left direction is equal to or greater than the number of time in the upper right direction.

When the number of time in the upper left direction is equal to or greater than the number of time in the upper right direction, the pointing direction identification unit 404 proceeds to the process of S436, but in another case, the process proceeds to the process of S438.

At step 436 (S436), the pointing direction identification unit 404 identifies the pointing direction as the upper left direction, and completes the process.

At step 438 (S438), the pointing direction identification unit 404 identifies the pointing direction as the upper right direction and completes the process.

Further, although the attention data history storage unit 402 (FIG. 13) stores attention data information for browsing document data from a browsing starting time to a present time as an attention data history up to the browsing end in the present exemplary embodiment, the attention data history storage unit 402 may store all pieces of attention data information for the plural browsing document data in the past browsing of each viewer as the attention data history.

In this case, the attention data history storage unit 402 stores identification information (for example, log-in ID to the data processing apparatus 12 (FIG. 1)) for identifying a viewer in association with the attention data history of the viewer for each viewer.

(Modification Example 1)

In the exemplary embodiment of the invention, the attention data identification unit 218 (FIGS. 4 and 13) identifies attention data by the tap motion using the pointing unit, but for example, when a unit of browsing object data is a character, plural adjacent characters may be identified as a series of attention data by the drag motion using the pointing unit on the display screen of the browsing document data.

Figure 15A:
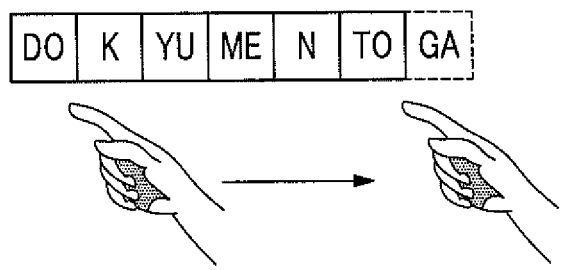
FIG. 15A is a diagram exemplifying a highlight of a series of attention data in a case of performing a drag motion with the right finger.
Figure 15B:
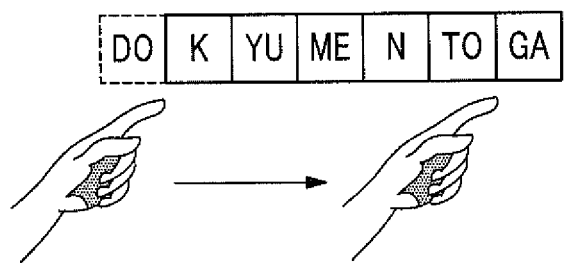
FIG. 15B is a diagram exemplifying a highlight of a series of attention data in a case of performing a drag motion with the left finger.

FIG. 15A is a diagram exemplifying a highlight of a series of attention data in a case of performing a drag motion with the right finger (pointing unit), and FIG. 15B is a diagram exemplifying a highlight of a series of attention data in a case of performing a drag motion with the left finger.

In a case where a drag motion is performed with the right finger from the start position to the end position, illustrated in FIG. 15A, the attention data identification unit 218 (FIGS. 4 and 13) identifies each character of "do", "k", "yu", "me", "n", "to" that are browsing object data, as a series of attention data.

In a case where a drag motion is performed with the left finger from the start position to the end position, illustrated in FIG. 15B, the attention data identification unit 218 (FIGS. 4 and 13) identifies each character of "k", "yu", "me", "n", "to", "ga" being browsing object data items, as a series of attention data.

(Modification Example 2)

In the exemplary embodiment of the present invention, although the region identification unit 216 (FIGS. 4 and 13) identifies, as attention region, the upper left region 240 (FIG. 6A) or the upper right region 242 (FIG. 6B) which is obtained by dividing the circle of a predetermined radius, centered on a pointing position, into four in a vertical direction and a horizontal direction with respect to the display screen, the attention region may be corrected using a history of the attention data information in order for the attention data identification unit 218 to identify the attention data that further matches the intention of the viewer.

For example, the region identification unit 216 corrects the attention region, based on a positional relationship (for example, a degree to a center of a range indicated by the placement position from the pointing position) between the placement position of the attention data that is included in the history of the attention data information and modified by the attention data modification unit 220 (FIG. 4) and the pointing position corresponding to the corrected attention data.

Specifically, for example, the region identification unit 216 takes an average of the degrees to the center of the range indicated by the placement position from the pointing positions of respective attention data information items, and identifies the region of a fan shape of a predetermined degree centered on the average degree.

In addition, the region identification unit 216 corrects the attention region for each viewer as described above, and also may correct the attention region for each browsing document data item.

(Modification Example 3)

In the exemplary embodiment of the present invention, the position information acquisition unit 212 (FIGS. 4 and 13) acquires position information by the tap motion to the display screen using the pointing unit, the pointing direction identification unit 214 (FIG. 4) identifies the pointing direction, based on the operation information, and the pointing direction identification unit 404 (FIG. 13) identifies the pointing direction, based on the operation information or the attention data history.

On the other hand, as the modification example of the exemplary embodiment of the present invention, in a case where a camera capable of capturing the display screen of the browsing document data is included in the data processing apparatus 12 (FIG. 1), without the pointing unit being in contact with the display screen, the position information acquisition unit 212 may acquire the position information, from the position of the pointing unit on the display screen captured by the camera.

In addition, the first pointing direction identification unit 214 (FIG. 4) and the second pointing direction identification unit 404 (FIG. 13) may identify the pointing direction according to the direction of the pointing unit on the display screen captured by the camera, without using the operation information or the attention data history.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A data processing apparatus comprising:
a display control unit, operable on a processor, that controls browsing document data to be displayed, the browsing document data being configured by a plurality of browsing object data items each of which is disposed at a predetermined position;
a position information acquisition unit, operable on a processor, that acquires position information, the position information being tapped by a pointing unit and indicating a tapped position corresponding to the browsing document data displayed by the display control unit;
a direction identification unit, operable on a processor, that identifies a direction starting from the tapped position, based on a history of a motion by the pointing unit when the browsing document data is browsed;
an attention data identification unit, operable on a processor, that identifies attention data indicating browsing object data that is focused, among the plurality of browsing object data items, based on the position information acquired by the position information acquisition unit and the direction identified by the direction identification unit, wherein
when a distance from the tapped position to the browsing object data is less than or equal to a predetermined distance, content having a minimum distance from the tapped position is identified as the attention data, and
when the distance from the tapped position to the browsing object data is greater than a predetermined distance, content that is present at the tapped position is identified as the attention data; and
an output unit that outputs the attention data identified by the attention data identification unit.

2. The data processing apparatus according to claim 1, further comprising:
a region identification unit, operable on a processor, that identifies a region in the browsing document data located in the direction identified by the direction identification unit, according to the position information acquired by the position information acquisition unit,
wherein the attention data identification unit identifies the attention data from the browsing object data included in the region identified by the region identification unit, among the plurality of browsing object data items.

3. The data processing apparatus according to claim 1, wherein the position information acquisition unit acquires the position information indicating a position with which the pointing unit comes into contact, in a display screen that displays the browsing document data.

4. The data processing apparatus according to claim 2, wherein the position information acquisition unit acquires the position information indicating a position with which the pointing unit comes into contact, in a display screen that displays the browsing document data.

5. The data processing apparatus according to claim 1, further comprising:
a capturing unit that captures a display screen that displays the browsing document data,
wherein the position information acquisition unit acquires the position information, based on an image of the pointing unit on the display screen captured by the capturing unit, and
wherein the direction identification unit identifies the direction, based on the image of the pointing unit on the display screen captured by the capturing unit.

6. The data processing apparatus according to claim 2, further comprising:
a capturing unit that captures a display screen that displays the browsing document data,
wherein the position information acquisition unit acquires the position information, based on an image of the pointing unit on the display screen captured by the capturing unit, and
wherein the direction identification unit identifies the direction, based on the image of the pointing unit on the display screen captured by the capturing unit.

7. The data processing apparatus according to claim 1, further comprising:
an attention data modification unit, operable on a processor, that modifies the attention data based on a tap by the pointing unit by replacing the attention data identified by the attention data identification unit, with browsing object data present at a position tapped by the pointing unit, as the attention data modified by the attention data modification unit.

8. The data processing apparatus according to claim 7, further comprising:
an attention data history storage unit, operable on a processor, that stores a history in which the attention data identified by the attention data identification unit and the attention data modified by the attention data modification unit are associated with the tapped position corresponding to each piece of the attention data identified by the attention data identification unit,
wherein the direction identification unit
estimates a direction pointing to each piece of the attention data in the history, from a positional relationship between the attention data stored by the attention data history storage unit and the tapped position corresponding to the attention data, and
identifies a direction pointed by the pointing unit, starting from the tapped position by the pointing unit in the displayed browsing document data, based on each estimated direction.

9. A data processing system comprising:
a document storage device that stores browsing document data configured by a plurality of browsing object data items each of which is disposed at a predetermined position; and
a data processing apparatus that processes the browsing document data stored in the document storage device,
wherein the data processing apparatus includes:
a display control unit, operable on a processor, that controls the browsing document data stored in the document storage device to be displayed;
a position information acquisition unit, operable on a processor, that acquires position information, the position information being tapped by a pointing unit and indicating a tapped position corresponding to the browsing document data displayed by the display control unit;
a direction identification unit, operable on a processor, that identifies a direction starting from the tapped position, based on a history of a motion by the pointing unit when the browsing document data is browsed;
an attention data identification unit, operable on a processor, that identifies attention data indicating browsing object data that is focused, among the plurality of browsing object data items, based on the position information acquired by the position information acquisition unit and a direction identified by the direction identification unit, wherein when a distance from the tapped position to the browsing object data is less than or equal to a predetermined distance, content having a minimum distance from the tapped position is identified as the attention data, and when the distance from the tapped position to the browsing object data is greater than a predetermined distance, content that is present at the tapped position is identified as the attention data; and an output unit, operable on a processor, that outputs the attention data identified by the attention data identification unit.

10. A non-transitory computer readable medium storing a program causing a computer to achieve functions, the functions comprising:

controlling browsing document data to be displayed, the browsing document data being configured by a plurality of browsing object data items each of which is disposed at a predetermined position;

acquiring position information, the position information being tapped by a pointing unit and indicating a tapped position corresponding to the browsing document data displayed by a control in the controlling;

identifying a direction starting from the tapped position, based on a history of a motion by the pointing unit when the browsing document data is browsed;

identifying attention data indicating browsing object data that is focused, among the plurality of browsing object data items, based on the position information acquired in the acquiring of the position information and a direction identified in the identifying of the direction, wherein when a distance from the tapped position to the browsing object data is less than or equal to a predetermined distance, content having a minimum distance from the tapped position is identified as the attention data, and when the distance from the tapped position to the browsing object data is greater than a predetermined distance, content that is present at the tapped position is identified as the attention data; and outputting the identified attention data.

11. The data processing apparatus according to claim 1, wherein the direction identification unit identifies the direction as an upper right direction from the tapped position, in case of a number of times being equal to or smaller than the predetermined value.

12. The data processing apparatus according to claim 1, wherein the predetermined value includes at least one of (iv) a number of a swipe motion in which the finger is moved from a lower right to a upper left, (v) a number of a swipe motion in which the finger is moved from an upper left to a lower right or (vi) a number of a termination position of a pinch-out motion being indicated in a lower right direction and a lower right direction from a start position of the pinch-out motion.

13. The data processing apparatus according to claim 1, wherein the direction identification unit identifies the direction based on an identification of a left finger or a right finger with which a browsing operation is performed, the identification being identified based on the history of the motion.

14. The data processing apparatus according to claim 13, wherein the direction identification unit identifies the direction as the upper left direction from the tapped position in case of the right finger is identified.

15. The data processing apparatus according to claim 13, wherein the direction identification unit identifies the direction as the upper right direction from the tapped position in case of the left finger is identified.

16. The data processing apparatus according to claim 1, wherein the direction identification unit identifies the direction as an upper left direction from the tapped position, when a number of times among the history is greater than a predetermined value, and wherein the number of times includes at least one of:
(i) a number of swipe motions in which the pointing unit is moved from a lower left position to an upper right position,
(ii) a number of swipe motions in which the pointing unit is moved from an upper right position to a lower left position, and
(iii) a number of termination positions of a pinch-out motion being indicated in a upper right direction and a lower left direction from a start position of the pinch-out motion.

17. The data processing apparatus according to claim 16, further comprising:

a region identification unit, operable on a processor, that identifies a region in the browsing document data located in the direction identified by the direction identification unit, according to the position information acquired by the position information acquisition unit, wherein the region is obtained by dividing a circle of a predetermined radius, centered on the tapped position, into four areas in a vertical direction and a horizontal direction with respect to the display screen, and identifying one of the four areas as the region, and the attention data identification unit identifies the attention data from the browsing object data included in the region identified by the region identification unit, among the plurality of browsing object data items.

* * * * *